(12) United States Patent
Ossi

(10) Patent No.: US 10,788,162 B2
(45) Date of Patent: Sep. 29, 2020

(54) RETROFIT KIT AND METHODS FOR CONVERSION OF FLUORESCENT LIGHT ASSEMBLIES TO LED ASSEMBLIES

(71) Applicant: c2 Semiconductor, LLC, Norfolk, VA (US)

(72) Inventor: Alessandro Ossi, Norfolk, VA (US)

(73) Assignee: c2 Semiconductor, LLC, Chesapeake, VA (US)

( * ) Notice: Subject to any disclaimer, the term of this patent is extended or adjusted under 35 U.S.C. 154(b) by 0 days.

(21) Appl. No.: 16/818,309

(22) Filed: Mar. 13, 2020

(65) Prior Publication Data

US 2020/0217459 A1 Jul. 9, 2020

Related U.S. Application Data

(62) Division of application No. 15/679,464, filed on Aug. 17, 2017, now Pat. No. 10,591,115.

(Continued)

(51) Int. Cl.

| | |
|---|---|
| *F21K 9/23* | (2016.01) |
| *F21S 8/02* | (2006.01) |
| *F21V 23/00* | (2015.01) |
| *F21S 8/04* | (2006.01) |
| *F21V 21/34* | (2006.01) |
| *F21V 19/00* | (2006.01) |

(Continued)

(52) U.S. Cl.
CPC ............... *F21K 9/23* (2016.08); *F21S 8/026* (2013.01); *F21S 8/04* (2013.01); *F21V 19/008* (2013.01); *F21V 21/34* (2013.01); *F21V 23/002* (2013.01); *F21V 19/04* (2013.01);

*F21Y 2103/10* (2016.08); *F21Y 2115/10* (2016.08); *H05B 45/00* (2020.01); *Y02B 20/386* (2013.01)

(58) Field of Classification Search
None
See application file for complete search history.

(56) References Cited

U.S. PATENT DOCUMENTS

| 7,036,995 B2 | 5/2006 | Kazi |
|---|---|---|
| 7,537,370 B2 | 5/2009 | Parker |

(Continued)

FOREIGN PATENT DOCUMENTS

| EP | 2163816 A2 | 3/2010 |
|---|---|---|
| JP | 2002-358817 A1 | 12/2002 |
| WO | WO2016/133493 | 8/2016 |

OTHER PUBLICATIONS

"K3A / K34 / K35—Ballast Pan Kit/T5/T8," Product Brochure, U.S. Energy Sciences.

(Continued)

*Primary Examiner* — Elmito Breval
(74) *Attorney, Agent, or Firm* — ReavesColey PLLC

(57) ABSTRACT

Devices and methods for converting fluorescent light assemblies. In some embodiments, an apparatus comprises a bracket having a first end portion, a second end portion, and a central portion. The central portion is located between the first end portion and the second end portion. The first end portion includes a first socket that is configured to be electrically coupled to a first end portion of a LED light tube. The second end portion includes a second socket that is configured to be coupled to a second end portion of the LED light tube. The central portion defines a notch that is positioned such that the bracket can be moved between a first configuration and a second configuration.

20 Claims, 29 Drawing Sheets

Related U.S. Application Data

(60) Provisional application No. 62/376,601, filed on Aug. 18, 2016, provisional application No. 62/424,087, filed on Nov. 18, 2016.

(51) Int. Cl.
  *F21Y 103/10* (2016.01)
  *H05B 45/00* (2020.01)
  *F21Y 115/10* (2016.01)
  *F21V 19/04* (2006.01)

(56) References Cited

U.S. PATENT DOCUMENTS

| | | |
|---|---|---|
| 8,152,331 B1 | 4/2012 | Barton et al. |
| 8,348,477 B2 | 1/2013 | Tickner et al. |
| 8,960,958 B1 | 2/2015 | Hsia et al. |
| 9,010,956 B1 | 4/2015 | Davis |
| 9,182,091 B2 | 11/2015 | Gershaw |
| 9,322,518 B1 | 4/2016 | Steedly |
| 9,453,618 B2 | 4/2016 | Loh |
| 9,447,935 B2 | 9/2016 | Catalano |
| 9,470,835 B2 | 10/2016 | Sheng |
| 9,494,304 B2 | 11/2016 | Dixon |
| 9,599,321 B2 | 3/2017 | Sorensen et al. |
| 9,631,789 B2 | 4/2017 | White et al. |
| 9,664,365 B2 | 5/2017 | Myers et al. |
| 9,714,743 B2 | 7/2017 | Shen et al. |
| 2007/0206376 A1 | 9/2007 | Lippis et al. |
| 2012/0113628 A1 | 5/2012 | Burrow et al. |
| 2013/0033861 A1 | 2/2013 | Orton |
| 2013/0176716 A1 | 7/2013 | Pratt et al. |
| 2014/0300274 A1 | 10/2014 | Acatrinei |
| 2015/0267873 A1 | 9/2015 | Price et al. |
| 2016/0138789 A1 | 5/2016 | Brown |
| 2016/0281972 A1 | 9/2016 | Novin et al. |
| 2016/0305641 A1 | 10/2016 | Lin et al. |
| 2016/0356459 A1 | 12/2016 | Clark et al. |
| 2017/0045209 A1 | 2/2017 | Schubert et al. |
| 2017/0097125 A1 | 4/2017 | Scalia |
| 2017/0138580 A1 | 5/2017 | Wen et al. |
| 2017/0167699 A1 | 6/2017 | Schubert et al. |
| 2017/0186926 A1 | 6/2017 | Kang |
| 2018/0324924 A1 | 11/2018 | Van De Sluis et al. |

OTHER PUBLICATIONS

International Search Report and Written Opinion for International Application No. PCT/US2017/047333, dated Nov. 29, 2017.
Office Action for U.S. Appl. No. 15/679,464, dated Jul. 19, 2019.

20

Remove all internal components from a troffer of a lighting fixture by:

A) Disconnecting power to the lighting fixture at a power distribution panel,
B) Opening a door frame of the lighting fixture and removing all existing fluorescent light tubes,
C) Removing all reflectors, a ballast, or a wire cover that exist from the lighting fixture,
D) Removing all brackets with any lamp sockets at each end of the lighting fixture,
E) Disconnecting the ballast from any incoming wires and removing the ballast from the lighting fixture; and
22

Installing a bracket into the troffer of the lighting fixture by:

A) Removing a male quick disconnect electrical connector from the electronics assembly an electrically coupled the quick disconnect fitting to the incoming power line
B) Orienting the bracket with all lamp sockets pointing down towards a floor,
C) Bending the bracket upwards about a transition point in the central portion of the bracket to move the bracket into a second configuration, which is sufficient allow the bracket to fit into the troffer of the lighting fixture,
D) Connect a female end of a wire harness of the lighting fixture into the male quick disconnect,
E) Raising the bracket, with a first hand, such that each end of the bracket make contact with a ceiling of the troffer,
F) Pushing the bracket up toward the ceiling of the troffer such that the bracket moves back towards the first configuration and the ends of the bracket are flush with an outside wall of the troffer,
G) Affixing each pre-loaded self-tapping screws into the troffer using a second hand
24

FIG. 23

RETROFIT KIT AND METHODS FOR CONVERSION OF FLUORESCENT LIGHT ASSEMBLIES TO LED ASSEMBLIES

CROSS-REFERENCE TO RELATED APPLICATIONS

This application is a divisional of U.S. patent application Ser. No. 15/679,464, entitled "Retrofit Kit for Conversion of Fluorescent Light Assemblies," filed Aug. 17, 2017, (now U.S. Pat. No. 10,591,115), which claims benefit of priority to U.S. Provisional Application Ser. No. 62/376,601, entitled "Retrofit Kit for Conversion of Fluorescent Light Assemblies," filed Aug. 18, 2016, and U.S. Provisional Application Ser. No. 62/424,087, entitled "Retrofit Kit for Conversion of Fluorescent Light Assemblies," filed Nov. 18, 2016, each of which is incorporated herein by reference in its entirety.

BACKGROUND

The embodiments described herein relate generally to the field of converting fluorescent light assemblies into light-emitting diode ("LED") light assemblies. LED light assemblies are more efficient, versatile, and durable than fluorescent light assemblies.

Fluorescent light assemblies have been in use since the 1930's and are typically installed to provide general lighting of large indoor spaces such as warehouses, schools, retail stores, or the like. Often, known fluorescent lighting assemblies include a channel (or housing) in the form of an inverted trough, otherwise known as a "troffer." The troffer is usually attached to, or recessed in, the ceiling. Lamp holders or sockets are attached to the troffer. A ballast is attached within the troffer and electrical wiring attaches the ballast to the sockets. Power is supplied to the ballast by electrical wiring brought into the troffer through the top or end of the troffer. The ballast and electrical wiring are covered with a ballast cover. One or more linear fluorescent lamps are then placed in the sockets for operation of the lighting fixture.

Other variations of fluorescent lighting assemblies are commonly known as "strip fixtures." Such fixtures typically include a channel affixed to either a wall or ceiling and covered with a channel cover. Lamp sockets are attached to the outer surface of the channel cover. A ballast is attached within the channel and electrical wiring attaches the ballast to the sockets. Power is supplied to the ballast by electrical wiring brought into the channel through the top or end of the channel. One or more linear fluorescent lamps are then placed in the sockets for operation of the lighting fixture. These lamps may be placed in parallel or in an end-to-end configuration. In instances where the lamps are place end-to-end the total length of the strip fixture may exceed eight feet in length, or twice the length of a single fluorescent lamp.

Currently, fluorescent lighting assemblies are installed in abundance, due to the low cost and utilitarian use of fluorescent lights compared with traditional incandescent lights. More recently, the innovation of LED lighting has provided a more advantageous alternative to fluorescent lighting. LED lighting does not use mercury, turns on more instantaneously, has a longer service life, is more versatile, and provides greater efficiency than fluorescent lighting. Thus, there are known methods of converting existing fluorescent lighting assemblies to take advantage of LED technology. However, such known methods are time consuming and labor intensive. Specifically, retrofitting fluorescent lighting fixtures usually requires closing down areas of a building during the retrofitting process. Accordingly, the speed and efficiency with which the retrofit process is completed is an important factor in considering a retrofit kit.

To accommodate the standard troffer size and design, which includes an opening that is shorter length than the bracket spacing needed to mount standard length light tubes, some known retrofit kits employ specialized bracket that have a different (i.e., shorter) length than that of a standard troffer. Such specialized brackets are often "hard wired" with the T5 or T8 LED light tubes pre-mounted in the bracket. Thus, when the LED light tube fails, replacement of the entire bracket may be necessary, and which may require time consuming and complicated rewiring of the bracket to exchange the LED light tubes. Some known retrofit kits employ multiple brackets to accommodate a standard length T5 or T8 light tube within the troffer. Such known kits, however, are installed using multiple operations that can require measurement, multiple installers, or the like.

To accommodate the standard strip fixtures size and design, some known retrofit kits employ lengthy channel covers (also referred to as "pans," "trays," or "brackets") or multiple covers with electrical components in each. Such known kits, however, are heavy and cumbersome to install, requiring multiple steps to install. For example, some known kits require preassembly of separate components, such as brackets, lamp sockets, and wire harnesses before the pans are installed to the strip channel mounting fixture. Moreover, to account for the large lengths of many known strip light channels (e.g., greater than 8 feet), some known retrofit kits include lengthy components, which are difficult to ship, store, and install. In other approaches, multiple retrofit kits may be employed but the use of multiple kits will often necessitate that multiple electrical connections be established during installation. As a result, such known kits will require multiple installers or multiple electrical connections per fixture, slowing the pace of conversion.

Further, most known strip fixture channels accommodate pans having either a width of five inches or a width of 4.25 inches. Known retrofit kits cannot be used interchangeably, and must be purchased in one size or the other.

Thus, a need exists for improved devices, methods, and kits for converting fluorescent light assemblies.

SUMMARY

Devices, methods, and kits for converting fluorescent light assemblies are disclosed herein. In some embodiments, an apparatus includes a bracket assembly having a first end portion, a second end portion, and a central portion located between the first end portion and the second end portion. The first end portion includes a first socket that is configured to be electrically coupled to a first end portion of a LED light assembly. The second end portion includes a second socket that is configured to be coupled to a second end portion of the LED light assembly. The central portion joins the first end portion and the second end portion in such a manner that the second end portion can move relative to the first end portion, allowing the bracket assembly to transition between a first configuration and a second configuration. The bracket assembly has a first length when the bracket assembly is in the first configuration, and a second length when the bracket assembly is in the second configuration. The second length is less than the first length.

BRIEF DESCRIPTION OF THE DRAWINGS

FIG. 23 is a flow chart of a method of converting a lighting fixture from a fluorescent lighting fixture to a LED lighting fixture according to an embodiment.

DETAILED DESCRIPTION

Figure 1:
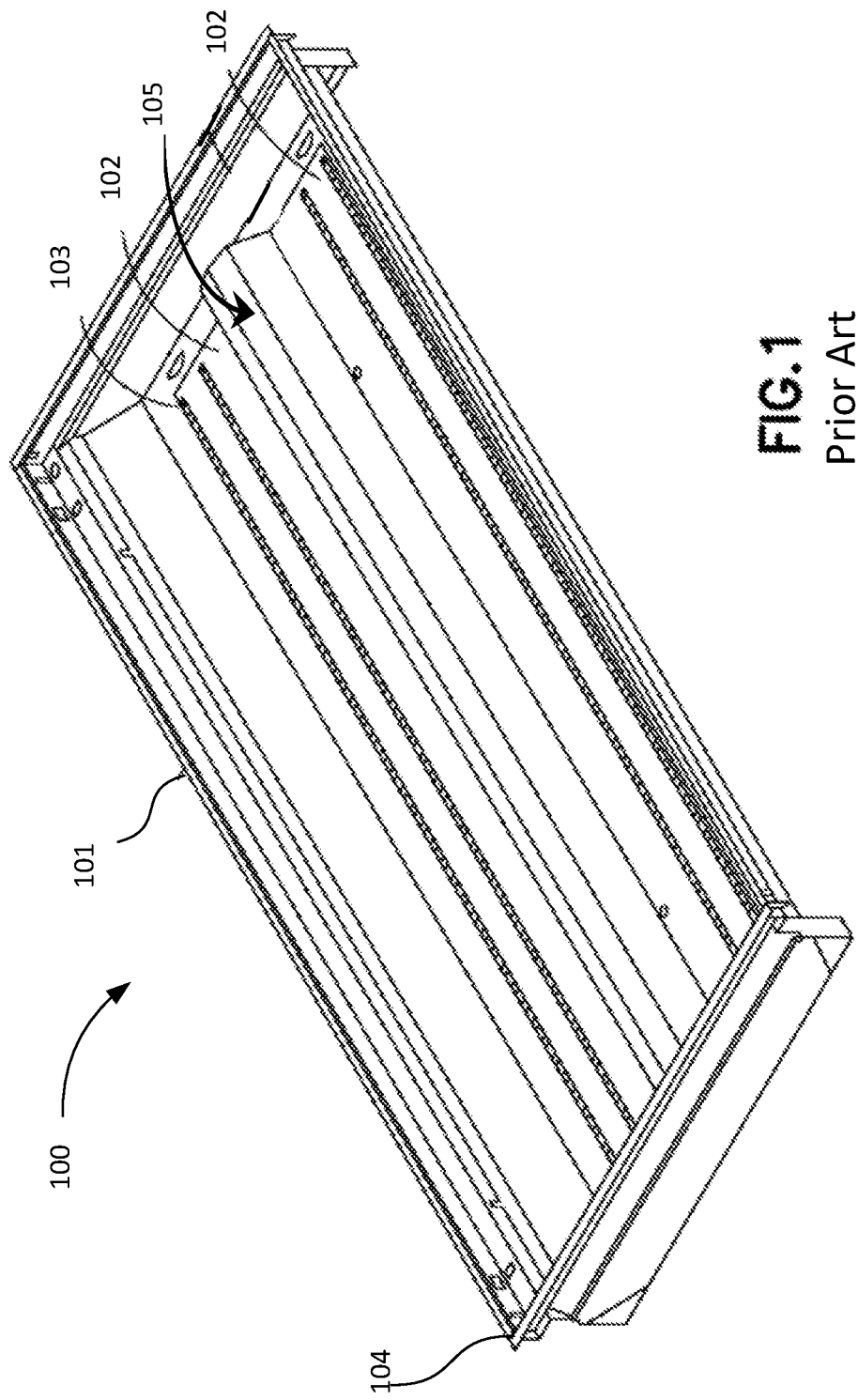
FIG. 1 is a perspective view of a prior art troffer of a lighting fixture.

Devices, methods, and kits for converting fluorescent light assemblies are disclosed herein. In some embodiments, an apparatus includes a bracket assembly having a first end portion, a second end portion, and a central portion located between the first end portion and the second end portion. The first end portion includes a first socket that is configured to be electrically coupled to a first end portion of a LED light assembly. The second end portion includes a second socket that is configured to be coupled to a second end portion of the LED light assembly. The central portion joins the first end portion and the second end portion in such a manner that the second end portion can move relative to the first end portion, allowing the bracket assembly to transition between a first configuration and a second configuration. The bracket assembly has a first length when the bracket assembly is in the first configuration, and a second length when the bracket assembly is in the second configuration. The second length is less than the first length.

In some embodiments, an apparatus includes a first bracket member and a second bracket member. The first bracket member has a first end portion and a second end portion. The first end portion includes a first connector portion and a first socket, the first socket configured to be electrically coupled to a first end portion of a LED light assembly. The second bracket member has a first end portion and a second end portion. The first end portion of the second bracket member has a second connector portion configured to engage the first connector portion to movably couple the second bracket member to the first bracket member. The second end portion of the second bracket member includes a second socket configured to be coupled to a second end portion of the LED light assembly. The second bracket member is configured to rotate relative to the first bracket member from a first position to a second position. A first longitudinal axis of the first bracket member and a second longitudinal axis of the second bracket member define a first bracket angle when the second bracket assembly is in the first position. The first longitudinal axis and the second longitudinal axis define a second bracket angle when the second bracket assembly is in the second position, the second bracket angle less than the first bracket angle.

In some embodiments, an apparatus includes a bracket assembly having a first end portion, a second end portion, and a central portion between the first end portion and the second end portion. The first end portion includes a first socket configured to be electrically coupled to a first end portion of a LED light assembly. The second end portion includes a second socket configured to be coupled to a second end portion of the LED light assembly. The central portion is configured to deform such that the second end portion can move relative to the first end portion to transition the bracket assembly between a first configuration and a second configuration. The bracket assembly has a first length when the bracket assembly is in the first configuration and a second length when the bracket assembly is in the second configuration. The second length is less than the first length.

In some embodiments, a method of installing a LED lighting fixture, includes transitioning a bracket assembly from a first configuration to a second configuration. The bracket assembly includes a first end portion having a first socket and a second end portion having a second socket. The bracket assembly has a first length when the bracket is in the first configuration, and a second length when the bracket is in the second configuration. The first length is such that a LED light assembly can be coupled to the first socket and the second socket. The second length is less than the first length. Once the bracket assembly is transitioned to the second configuration, it is moved into an inner volume of a troffer. The bracket assembly is then transitioned from the second configuration back towards the first configuration such that the first end portion and the second end portion of the bracket each contact an inner surface of the troffer. The bracket assembly is then fastened to the inner surface of the troffer.

In some embodiments, a method of converting a lighting fixture from a fluorescent lighting fixture to a light-emitting diode lighting fixture includes disconnecting power to the lighting fixture and removing a fluorescent light component from a troffer of the lighting fixture. Removing the fluorescent light component may include removing a fluorescent light tube from within the troffer, removing a wire cover from within the troffer, removing a fluorescent light bracket, removing any fluorescent lamp sockets from within the troffer, and removing a ballast from within the troffer. Removing a ballast will expose an incoming power line. With the removal of the fluorescent light components, an electrical connector is coupled to the incoming power line. A bracket assembly is then positioned so that a first socket attached to a first end portion of the bracket assembly and a second socket attached to a second end portion of the bracket assembly are oriented downward. The bracket assembly is bent in a first direction about a transition point in a central portion of the bracket assembly until a bracket length between the first end portion and the second end portion is less than an opening length of an opening into the troffer. The electrical connector is connected to an electronic assembly of the bracket assembly. The bent bracket is then moved into the troffer. Once the first end portion and the second end portion are each in contact with an inner surface of the troffer, a force is exerted on the central portion of the bracket assembly. The force is sufficient to bend the bracket assembly in a second direction. Once this is accomplished, captive fasteners are moved into the inner surface of the troffer, securing the bracket assembly.

In some embodiments, a method of installing a LED lighting fixture includes moving a bracket assembly such that a first bracket member covers a first end portion of a mounting fixture. An end portion of the first bracket member includes a first socket configured to be electrically coupled to a first end portion of a LED light assembly. A second bracket member of the bracket assembly is movably coupled to the first bracket member and suspended from the first bracket member during the moving. An end portion of the second bracket member includes a second socket configured to be coupled to a second end portion of the LED light assembly. The first bracket member is secured to the first end portion of the mounting fixture with fasteners captively coupled to the first bracket member. Once the first bracket member is secured, the second bracket member is rotated relative to the first bracket member until the second bracket member is in the desired location about a second end portion of the mounting fixture. The second bracket member is then secured to the second bracket member with fasteners captively coupled to the second bracket member.

The term "about" when used in connection with a referenced numeric indication means the referenced numeric indication plus or minus up to 10 percent of that referenced numeric indication. For example, "about 100" means from 90 to 110.

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with, for example, a geometric relationship, a numerical value, and/or a range is intended to convey that the geometric relationship (or the structures described thereby), the number, and/or the range so defined is nominally the recited geometric relationship, number, and/or range. For example, two structures described herein as being "substantially parallel" is intended to convey that, although a parallel geometric relationship is desirable, some non-parallelism can occur in a "substantially parallel" arrangement. By way of another example, a structure defining a width that is "substantially five inches" is intended to convey that, while the recited width is desirable, some tolerances can occur when the width is "substantially" the recited volume (e.g., 5 in). Such tolerances can result from manufacturing tolerances, measurement tolerances, and/or other practical considerations (such as, for example, minute imperfections, age of a structure so defined, a pressure or a force exerted within a system, and/or the like). As described above, a suitable tolerance can be, for example, of ±10 percent of the stated geometric construction, numerical value, and/or range. Furthermore, although a numerical value modified by the term "substantially" can allow for and/or otherwise encompass a tolerance of the stated numerical value, it is not intended to exclude the exact numerical value stated.

As used herein, the term "set" can refer to multiple features or a singular feature with multiple parts. For example, when referring to set of walls, the set of walls can be considered as one wall with multiple portions, or the set of walls can be considered as multiple, distinct walls. Thus, a monolithically-constructed item can include a set of walls. Such a set of walls can include, for example, multiple portions that are either continuous or discontinuous from each other. A set of walls can also be fabricated from multiple items that are produced separately and are later joined together (e.g., via a weld, an adhesive, or any suitable method).

In a common variant, a fluorescent lighting assembly (or luminaire) includes a troffer that is attached to or recessed in a ceiling. FIG. 1 is a perspective view of a known troffer of a lighting fixture 100 showing the inside of the troffer 101. Components such as lamp holders (not shown), also known as sockets or lamp sockets, are attached to the top surface 103 of the troffer 101. The internal volume 102 of the troffer 101 also includes components such as the light tubes (not shown), additional wiring (not shown), and/or a ballast 105. The ballast 105 regulates the electrical current to the fluorescent light tubes and provides sufficient voltage to start the fluorescent light tubes. As shown, the standard troffer 101 includes a lip 104 that extends around the opening into the internal volume 102. The lip 104 can be used, for example, to assist in mounting the troffer 101 into the ceiling of the building. The lip 104 of the troffer 101, however, forms an outer edge that can impede the installation of new components when converting a fluorescent lighting assembly to a LED lighting assembly. Specifically, the lip 104 can cause the length of the opening to be shorter than the length of a fully assembled bracket to which standard length LED light tubes are mounted.

Other variations of fluorescent lighting assemblies are commonly known as "strip fixtures." Such fixtures typically include a channel affixed to either a wall or ceiling and covered with a channel cover. Lamp sockets are attached to the outer surface of the channel cover. A ballast is attached within the channel and electrical wiring attaches the ballast to the sockets. Power is supplied to the ballast by electrical wiring brought into the channel through the top or end of the channel. One or more linear fluorescent lamps are then placed in the sockets for operation of the lighting fixture. These lamps may be placed in parallel or in an end-to-end configuration. In instances where the lamps are place end-to-end the total length of the strip fixture may exceed eight feet in length, or twice the length of a single fluorescent lamp. While strip fixtures do not typically exhibit the same limitations for retrofit caused by the lip 104, this length presents retrofit challenges.

The embodiments described herein provide a novel approach for converting existing fluorescent lighting assemblies without compromising the length of the LED light tubes that are installed into the troffers (e.g., troffer 101) of the existing lighting fixtures, employing lengthy retrofit kits, or using multiple retrofit kits requiring multiple electrical connections be established during installation. Simply stated, the embodiments described herein allow for the rapid installation of a bracket or bracket assembly for use with standard length LED light assemblies (e.g., T5 or T8 tubes).

For example, FIGS. 2-5 show illustrations of a bracket assembly 190, according to an embodiment. The bracket assembly 190 includes a movable bracket 120 that contains the electrical wiring and sockets (the sockets 164, 165) for converting an existing fluorescent lighting fixture into a LED lighting fixture. As described herein, the bracket assembly 190 can transition between a first configuration (see FIGS. 2 and 5) and a second configuration (see FIGS. 3-4) to facilitate installation within an existing troffer 100. Specifically, when the bracket assembly 190 is in its second configuration, the bracket assembly 190 can be moved through the opening 106 clearing the lip 104 and into the interior volume 102 of the troffer 100. The bracket assembly 190 can then be transitioned to its first configuration to accommodate a standard-length LED light assembly 110.

Figure 2:
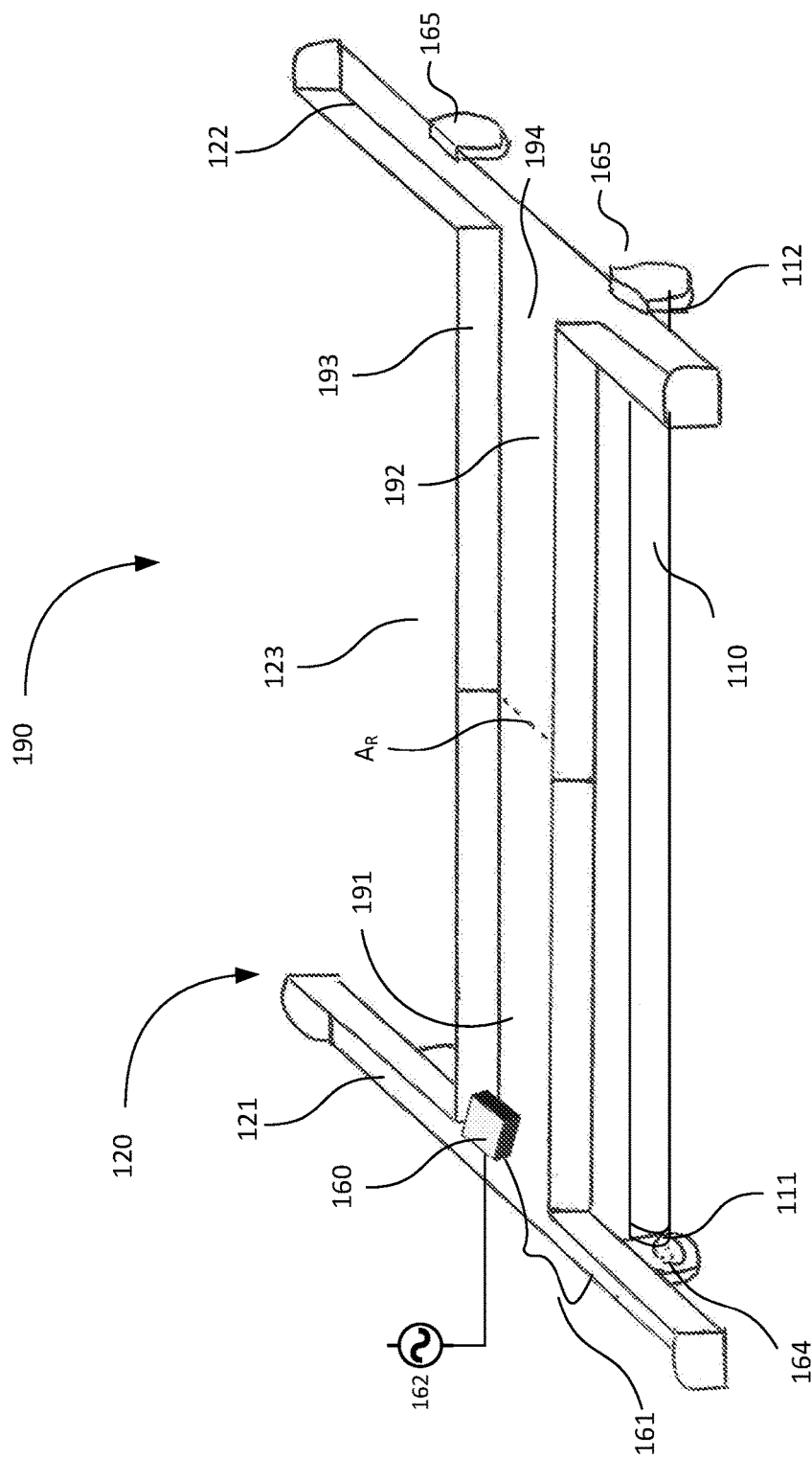
FIG. 2 is a schematic illustration of a LED retrofit bracket assembly according to an embodiment.

As shown in FIG. 2, the bracket 120 has a first end portion 121, a second end portion 122, and a central portion 123 between the first end portion 121 and the second end portion 122. While the particular embodiment illustrated in FIG. 2 shows the central portion 123 as being longer than, and perpendicular to, the first end portion 121 and the second end portion 122, this illustration is not intended to limit the possible orientation in other embodiments of the central portion 123, the first end portion 121 and the second end portion 122. For example, in some embodiments, the central portion 123 may be shorter than the first end portion 121 or the second end portion 122 and placed along the same longitudinal axis as the end portions.

The first end portion 121 defines a longitudinal axis $A_1$ (see FIG. 3), and includes (or is coupled to) a first socket 164 configured to be electrically coupled to a first end portion 111 of a LED light assembly 110. The socket 164 can be coupled to the first end portion 121 of the bracket 120 by any suitable mechanism. For example, in some embodiments, the socket 164 can be coupled to the first end portion 121 by a mechanical fastener (e.g., a screw, a clip, or the like), by an interference fit (e.g., within an opening defined by the bracket 120), by an adhesive, or by a weld joint. Because the socket 164 is coupled to the first end portion 121 of the bracket 120, the socket 164 also provides structural support to the LED light assembly 110 coupled thereto. The socket 164 (and any of the sockets described herein) can be any suitable socket, such as a pre-wired socket that can hold a standard T8 LED light tube. In some embodiments, the socket 164 (and any of the sockets described herein) can be a BJB model 26.292 series push through lamp holder (e.g., model 26.292.1111.50) or a LEVITON 13661-SWP lamp holder.

In various embodiments, additional sockets (not shown) may be coupled to the first end portion 121 and configured to mechanically support the LED light assembly 110. For example, in some embodiments, the bracket assembly 190 can include 2, 3, 4, or more sockets, each configured to support an end portion of a LED light assembly. Moreover, in some embodiments, the bracket assembly 190 can optionally include an electronics assembly 160. The electronics assembly 160 can be coupled to any portion of the bracket 120, and can include the wiring, connectors, and circuitry to electrically couple the socket 164 (and thus the LED light assembly 110) to a power source (not shown). For example, as shown in FIG. 2, in some embodiments, the electronics assembly 160 can include wiring 161 that is coupled to the socket 164, electronics component 163, and power connector 162. In other embodiments, however, the electronics assembly need not include these components. In still other embodiments, the electronics assembly 160 can include a wireless controller configured to receive a wireless communications signal and adjust power supplied to the first socket via the power source in response to the wireless communication signal.

The second end portion 122 defines a longitudinal axis $A_2$ and includes a second socket 165 configured to be coupled to and mechanically support a second end portion 112 of the LED light assembly 110. In some embodiments, the second end portion 122 does not provide an electrical connection between a power source (not shown) and the LED light assembly 110 and/or does not include any electronic components nor other wiring. Thus, in some embodiments, the second socket 165 provides only mechanical support to retain the LED light assembly 110 in the desired position (e.g., between the first socket 164 and the second socket 165, as shown in FIG. 2). The second socket 165 can be coupled to the second end portion 122 of the bracket 120 by any suitable mechanism. For example, in some embodiments, the second socket 165 can be coupled to the second end portion 122 by a mechanical fastener (e.g., a screw, a clip, or the like), by an interference fit (e.g., within an opening defined by the bracket 120), by an adhesive, or by a weld joint. The second socket 165 (and any of the sockets described herein) can be suitable socket, such as a pre-wired socket that can hold a standard T8 LED light tube. In some embodiments, the second socket 165 (and any of the sockets described herein) can be a BJB model 26.292 series push through lamp holder (e.g., model 26.292.1111.50) or a LEVITON 13661-SWP lamp holder. Moreover, although the bracket assembly 190 is shown as including two sockets 165 (only one is identified), in other embodiments, the bracket assembly 190 can include any number of sockets. For example, in some embodiments, the bracket assembly 190 can include 2, 3, 4, or more sockets 165, each configured to support an end portion of a LED light assembly.

Figure 9:
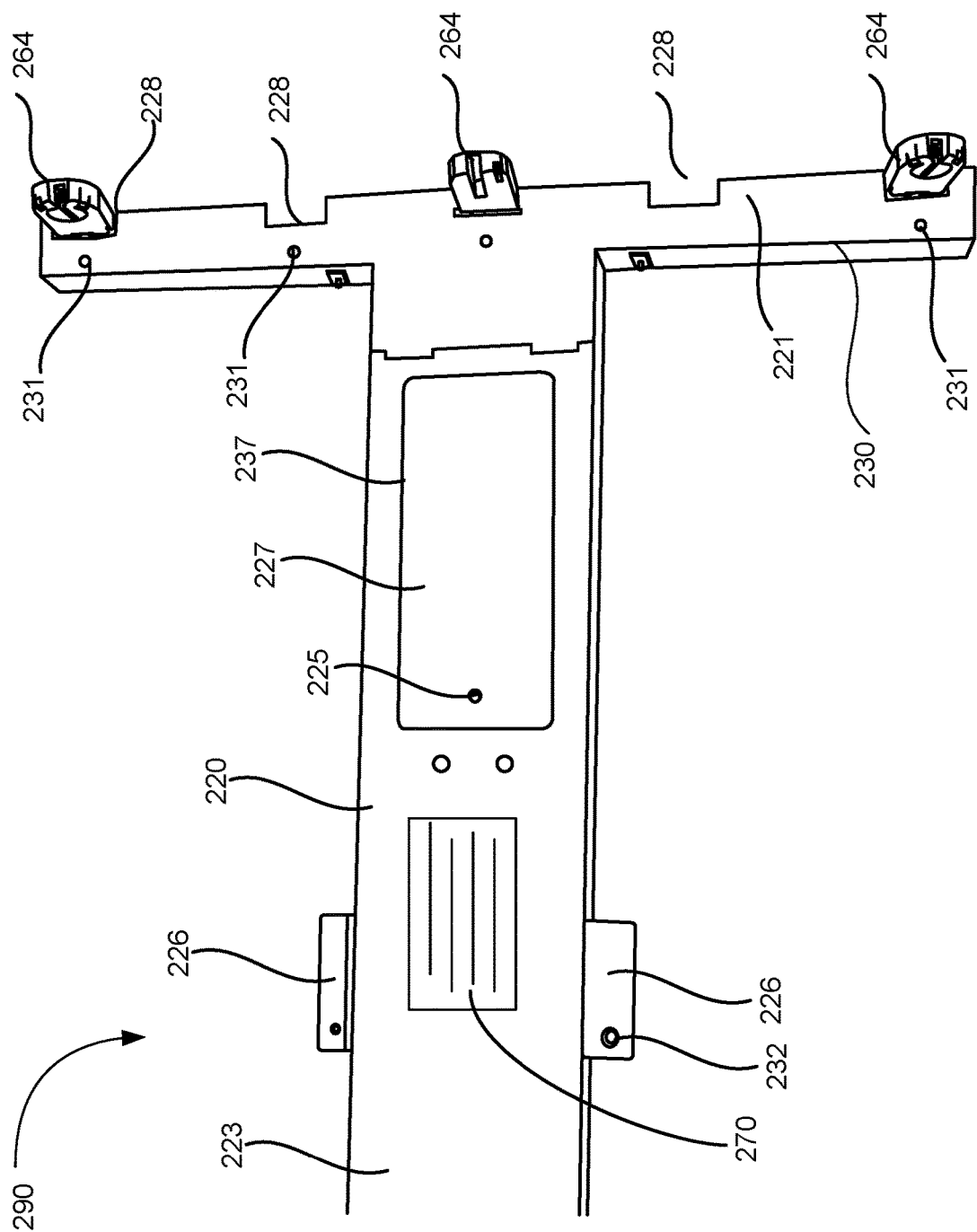
FIG. 9 is a top view of the first portion and a segment of the central portion of the bracket assembly shown in FIGS. 6-8 with the light tube removed to show a warning label and an access panel.

The central portion 123 connecting the first end portion 121 to the second end portion 122 defines an axis of rotation $A_R$, and includes a first wall 191, a second wall 192, and a third wall 193. The first wall 191 connects the first end portion 121 to the second end portion 122. The second wall 192 and the third wall 193 are each attached to the first wall 191, with the second wall 192 being opposite the third wall 193. Collectively, the first wall 191, the second wall 192, and the third wall 193 define a channel 194. In some embodiments, the channel can contain the optionally included electronics component 163, wiring 161 or any other components of the bracket assembly 190. In this manner, when the bracket assembly is installed, such components can be covered and/or maintained in the enclosed channel. In some embodiments, the bracket 120 may also include an access panel (not shown, but see, e.g., FIG. 9 showing the access panel 227) movably coupled about an access opening (not shown, but see e.g., FIG. 9 showing the opening 237). The access panel can provide access to the enclosed channel without requiring that the bracket assembly 190 be removed from the inner surface of the troffer 100.

While FIG. 2 shows the second wall 192 and the third wall 193 in a configuration essentially perpendicular to the first wall 191, in other embodiments, the walls may be at any selected angle and it is not necessary that they be congruent. Although the second wall 192 and the third wall 193 are shown as being attached to the first wall 191 along outer edges of the first wall 191, in other embodiments, the second wall 192 and the third wall 193 may be attached to the first wall 191 at any suitable location across the first wall 191. In some embodiments, the second wall 192 and the third wall 193 may be shorter than the first wall 191, and each of the three walls may be a different length. In yet other embodiments, the central portion 123 need not include the second wall 192 and/or the third wall 193, and need not define a channel.

The central portion 123 is configured such that the second end portion 122 can move relative to the first end portion 121. This movement enables the bracket assembly 190 to transition between a first configuration, as shown in FIGS. 2 and 5, and a second configuration (See FIG. 3-5). When the bracket assembly 190 is in the first configuration, the bracket assembly 190 has a first length $L_1$ as shown in FIG. 5. In this configuration, the distance between the first socket 164 and the second socket 165 is defined by and/or is consistent with the length of the LED light assembly 110. In this manner, when the bracket assembly 190 is in the first configuration, the LED light assembly 110 can be coupled to (and between) the first socket 164 and the second socket 165. In some embodiments, the LED light assembly 110 includes a T8 LED light tube. Additionally, as shown in FIGS. 2 and 5, when the bracket assembly 190 is in the first configuration, the longitudinal axis $A_1$ of the first end portion 121 and the longitudinal axis $A_2$ of the second end portion 122 are substantially coaxial. Said another way, the longitudinal axis $A_1$ of the first end portion 121 and the longitudinal axis $A_2$ of the second end portion 122 define a first bracket angle that is about 180 degrees.

Figure 3:
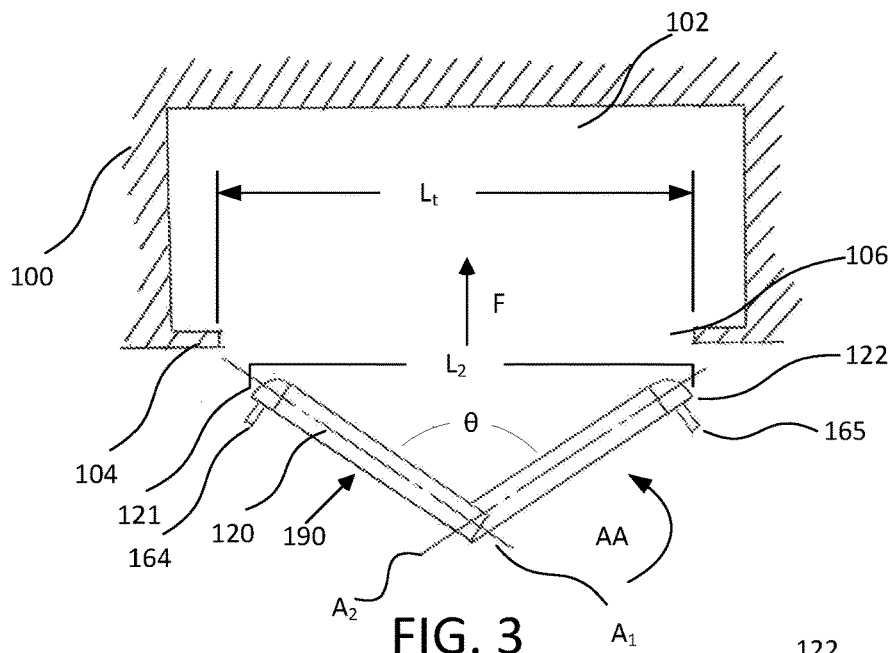
FIG. 3 is a schematic illustration of the bracket assembly shown in FIG. 2 in a second configuration.

When the bracket assembly 190 is in the second configuration, the bracket assembly 190 has a second length $L_2$ as shown in FIG. 3, which is less than the first length $L_1$. Additionally, the second length $L_2$ is less than a length $L_t$ of the opening 106 into the troffer 100. In this manner, when the bracket assembly 190 is in the second configuration, the bracket assembly 190 can fit through the opening 106 defined by the lip 104 of the troffer 100. Additionally, when the bracket assembly 190 is in the second configuration, the longitudinal axis $A_1$ of the first end portion 121 and the longitudinal axis $A_2$ of the second end portion 122 form a second bracket angle θ. The second bracket angle can be any suitable angle. For example, in some embodiments, the second bracket angle θ is less than about 170 degrees. In other embodiments, the second bracket angle θ is less than about 145 degrees. In other embodiments, the second bracket angle θ is less than about 120 degrees. In yet other embodiments, the second bracket angle θ is between about 80 degrees and about 100 degrees.

In use, the bracket assembly 190 can be transitioned between the first configuration and the second configuration to facilitate installation of the bracket assembly 190 into an existing troffer 100 according to any of the methods described herein. For example, prior to installation, the bracket assembly 190 can be transitioned from the first configuration (FIG. 2) to the second configuration (FIG. 3), with the second bracket angle θ being less than about 170 degrees. To transition the bracket assembly 190 from the first configuration to the second configuration, a rotational force AA is applied to the bracket assembly 190 so that the first end portion 121 and the second end portion 122 of the bracket assembly 190 are brought closer together and the second length $L_2$ is established. Similarly stated, the second end portion 122 can be moved relative to the first end portion 121 from a first position (corresponding to the first configuration of the bracket assembly 190) to a second position (corresponding to the second configuration of the bracket assembly 190). In instances involving mounting the bracket assembly in a troffer, as is shown in FIG. 3-5, the establishment of the second length $L_2$ will enable the bracket assembly 190 to be inserted past the surrounding lip 104.

The first end portion 121 can be moved towards the second end portion 122 in any suitable manner. For example, in some embodiments, the central portion 123 is configured to deform about the axis of rotation $A_R$ when the bracket assembly 190 is transitioned between the first configuration and the second configuration. In some such embodiments, the central portion 123 can define at least one perforation, opening, notch, or other feature to facilitate deforming the central portion about the axis of rotation $A_R$. In some such embodiments, the second wall 192 and/or the third wall 193 can include an opening or a notch, of the types shown and described herein. In some such embodiments, the central portion 123 can include a stress point, such as may be created by the reducing the thickness of the material along the axis of rotation $A_R$. In still other embodiments, the first wall 191 may include perforations positioned to facilitate deformation along the axis of rotation $A_R$ when the bracket assembly 190 is transitioned from the first configuration to the second configuration.

In other embodiments, however, the bracket assembly 190 can include multiple pieces that are coupled together at a hinged or pinned joint to facilitate movement of the first end portion 121 relative to the second end portion 122. Similarly stated, although in some embodiments, the first end portion 121, the second end portion 122, and the central portion 123 can be monolithically constructed, in other embodiments, any of the first end portion 121, the second end portion 122, and the central portion 123 can formed from separately-constructed components that are joined together. For example, in some embodiments, the first end portion 121 and the second end portion 122 can be separate components that are joined together via a rotational joint along the axis of rotation $A_R$.

Figure 4:
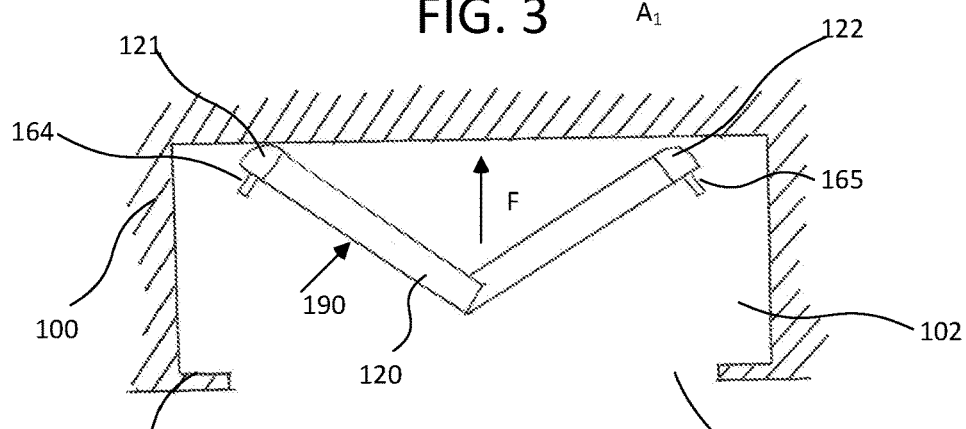
FIG. 4 is a schematic illustration of the bracket assembly shown in FIG. 2 in a second configuration and in contact with a mounting surface within a troffer.
Figure 5:
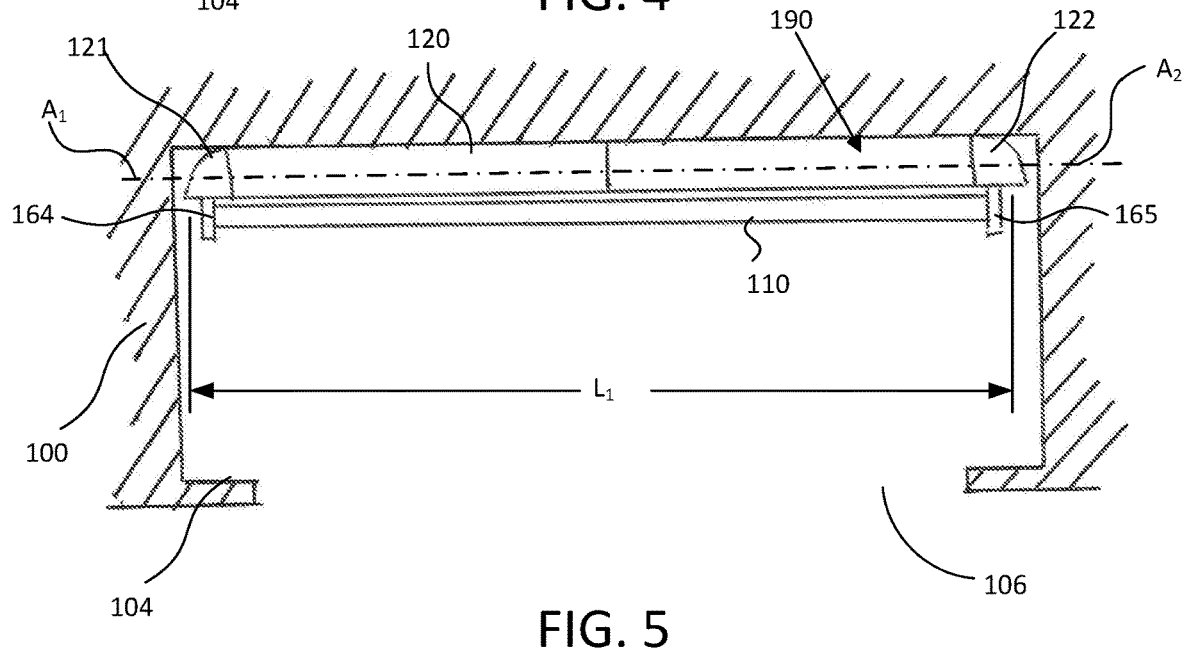
FIG. 5 is a schematic illustration of the bracket assembly shown in FIG. 2 in a first configuration in contact with a mounting surface within the troffer.
Figure 6:
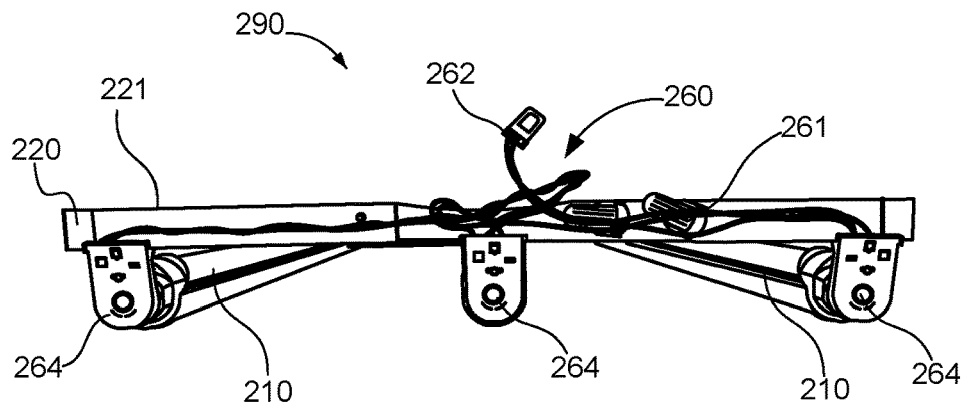
FIGS. 6-8 are a side view, a top view, and a bottom view, respectively, of a first end portion of a bracket assembly according to an embodiment.

After the bracket assembly 190 is in the second configuration, the bracket assembly can be moved, as shown by the arrow F, through the opening 106 and into contact with the mounting surface as shown in FIG. 4. The continued exertion of the force F will return the bracket assembly 190 to the first configuration. In some embodiments, the force F can be applied at or near the axis of rotation $A_R$, thereby urging the bracket assembly 190 back towards the first configuration when the first end portion 121 and the second end portion 122 are in contact with the upper surface of the troffer. Because the force F is applied at the central portion 123, it can be applied with a single hand. After the bracket assembly 190 has returned to the first configuration, the bracket assembly 190 can be fastened inside the troffer 100 using any suitable mechanism. For example, in some embodiments, the bracket assembly can include a series of captive fasteners that can be fastened to the troffer 100.

An example of a bracket 120 which may be monolithically constructed, or constructed via other selected means, is illustrated in FIGS. 6-18. FIGS. 6-18 show illustrations of a bracket assembly 290, according to an embodiment. The bracket assembly 290 includes a movable bracket 220 that contains the electrical wiring and sockets (the sockets 264, 265) for converting an existing fluorescent lighting fixture into a LED lighting fixture. As described herein, the bracket assembly 290 can transition between a first configuration (see FIG. 15) and a second configuration (see FIG. 16) to facilitate installation within an existing troffer 100. Similar to that described above for bracket assembly 190, when the bracket assembly 290 is in its second configuration, the bracket assembly 290 can be moved through the opening 106 clearing the lip 104 and into the interior volume 102 of the troffer 100. The bracket assembly 290 can then be transitioned to its first configuration to accommodate a standard-length LED light assembly 210.

Figure 8:
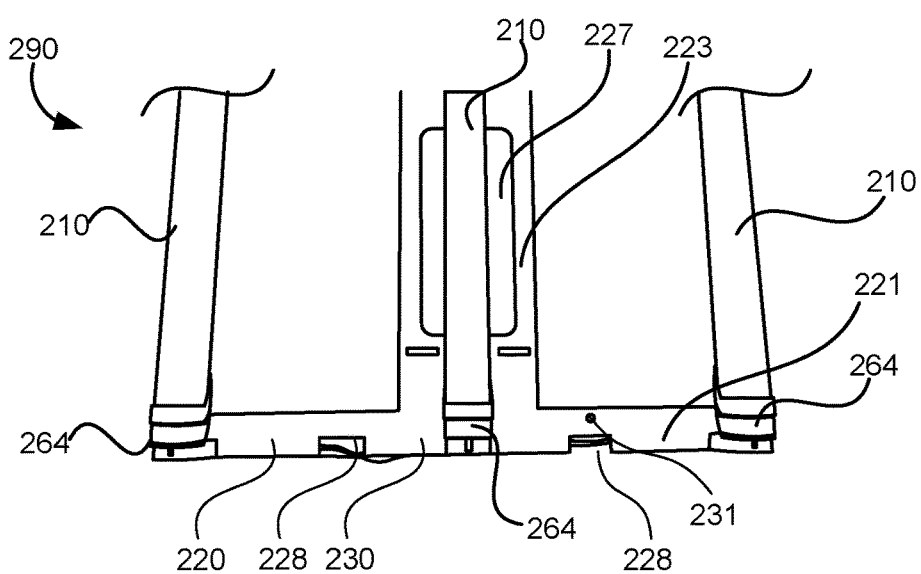
Figure 10:
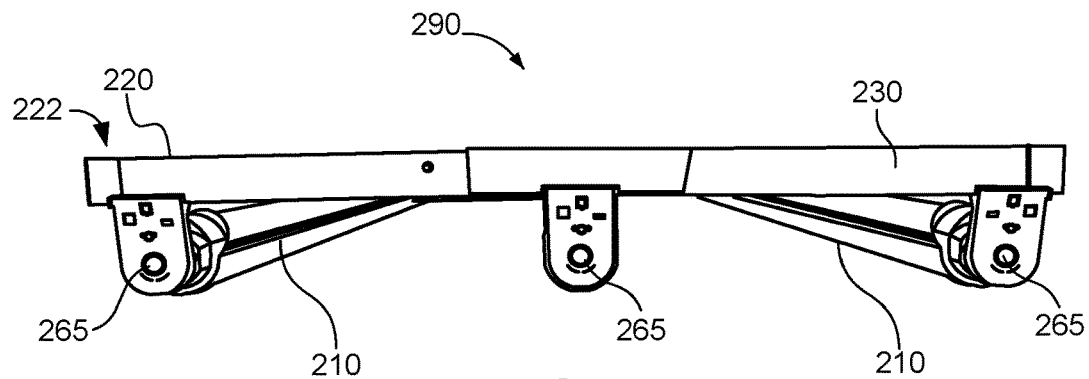
FIGS. 10-12 are a side view, a top view, and a bottom view, respectively, of a second end portion of the bracket assembly, the first end portion of which is shown in FIGS. 6-8.
Figure 15:
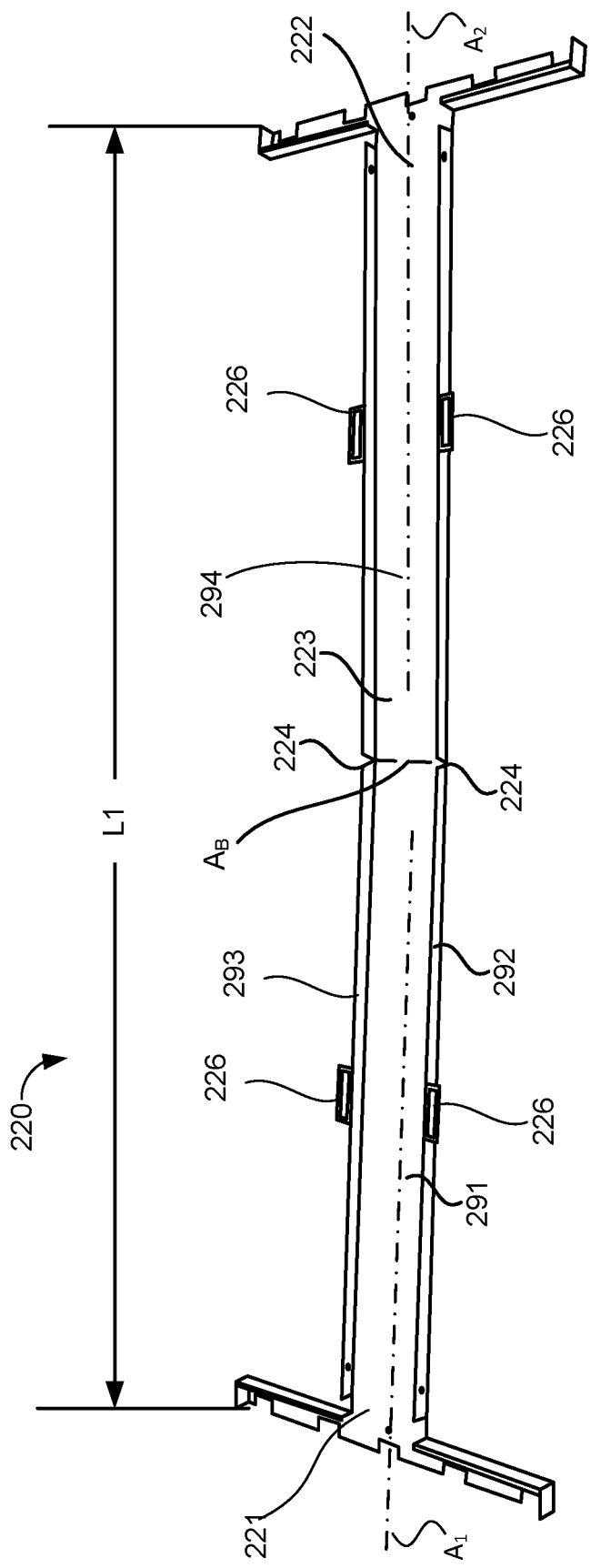
FIGS. 15-16 are side perspective views of the bracket of the bracket assembly shown in FIGS. 6-12 in a first configuration and a second configuration, respectively.

As shown in FIG. 15, the bracket 220 has a first end portion 221, a second end portion 222, and a central portion 223 between the first end portion 221 and the second end portion 222. The first end portion 221 and the second end portion 222 are each formed with a vertical (or lateral) edge 230 as is shown in FIGS. 9 and 10. The first end portion 221 defines a longitudinal axis $A_1$ (see, e.g., FIGS. 15 and 16) that is substantially normal to the vertical (or lateral) edge 230, and includes (or is coupled to) a set of first sockets 264. More particularly, as shown in FIGS. 8 and 9, the vertical edge 230 defines a series of indentations 228 and corresponding mounting holes 231. Each socket 264 is mounted within one of the indentations 228, and is retained in place by a protrusion or clip that is locked within the mounting hole 231. In other embodiments, however, the sockets 264 can be coupled to the first end portion 221 of the bracket 220 by any suitable mechanism. For example, in some embodiments, the sockets 264 can be coupled to the first end portion 221 by a mechanical fastener (e.g., a screw, a clip, or the like), by an interference fit (e.g., within an opening defined by the bracket 220), by an adhesive, or by a weld joint. Because the sockets 264 are coupled to the first end portion 221 of the bracket 220, the sockets 264 also provides structural support to the LED light assembly 210 coupled thereto.

As shown in FIG. 8, the first sockets 264 are each configured to be electrically coupled to a first end portion 211 of a LED light assembly 210. The sockets 264 (and any of the sockets described herein) can be suitable socket, such as a pre-wired socket that can hold a standard T8 LED light tube. In some embodiments, the sockets 264 (and any of the sockets described herein) can be a BJB model 26.292 series push through lamp holder (e.g., model 26.292.1111.50) or a LEVITON 13661-SWP lamp holder. Similar to that described above for bracket assembly 190, various embodiments may include any number of additional sockets (not shown) coupled to the first end portion 221, and the first end portion 221 may be configured to accept the additional sockets within the indentations 228. As described in more detail below, the bracket assembly 290 can optionally include an electronics assembly 260 (see FIG. 6). The electronics assembly 260 can be coupled to any portion of the bracket 220, and includes the wiring 261, connectors 262, and circuitry (not shown) to electrically couple the sockets 264 (and thus the LED light assembly 210) to a power source (not shown).

Figure 11:
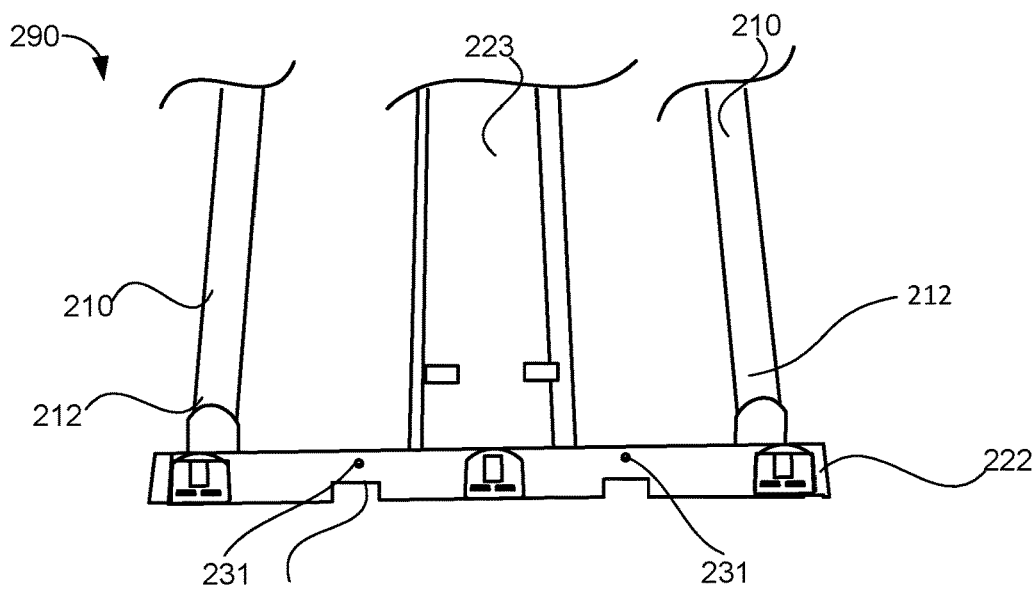
Figure 12:
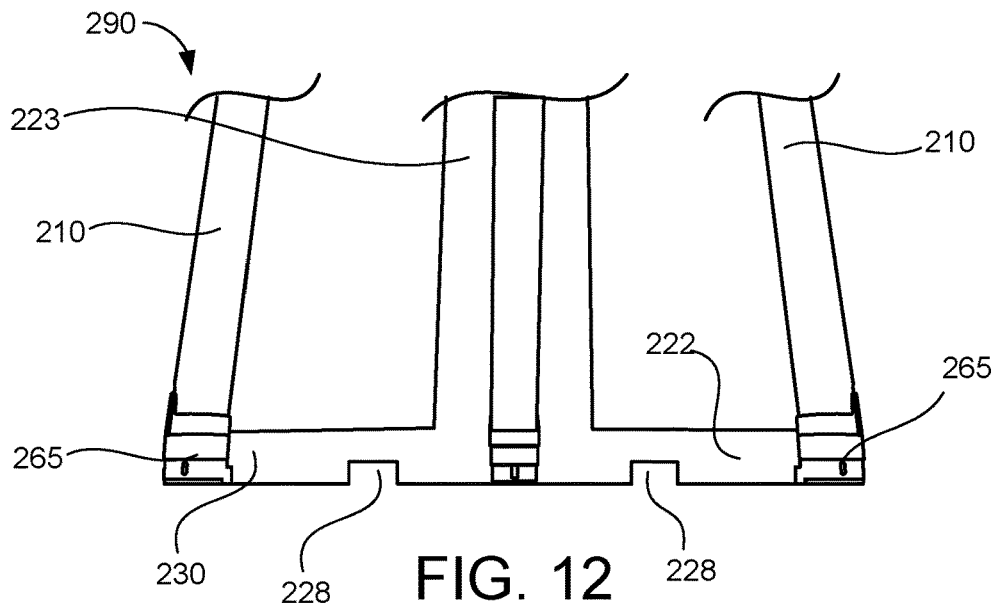
Figure 13:
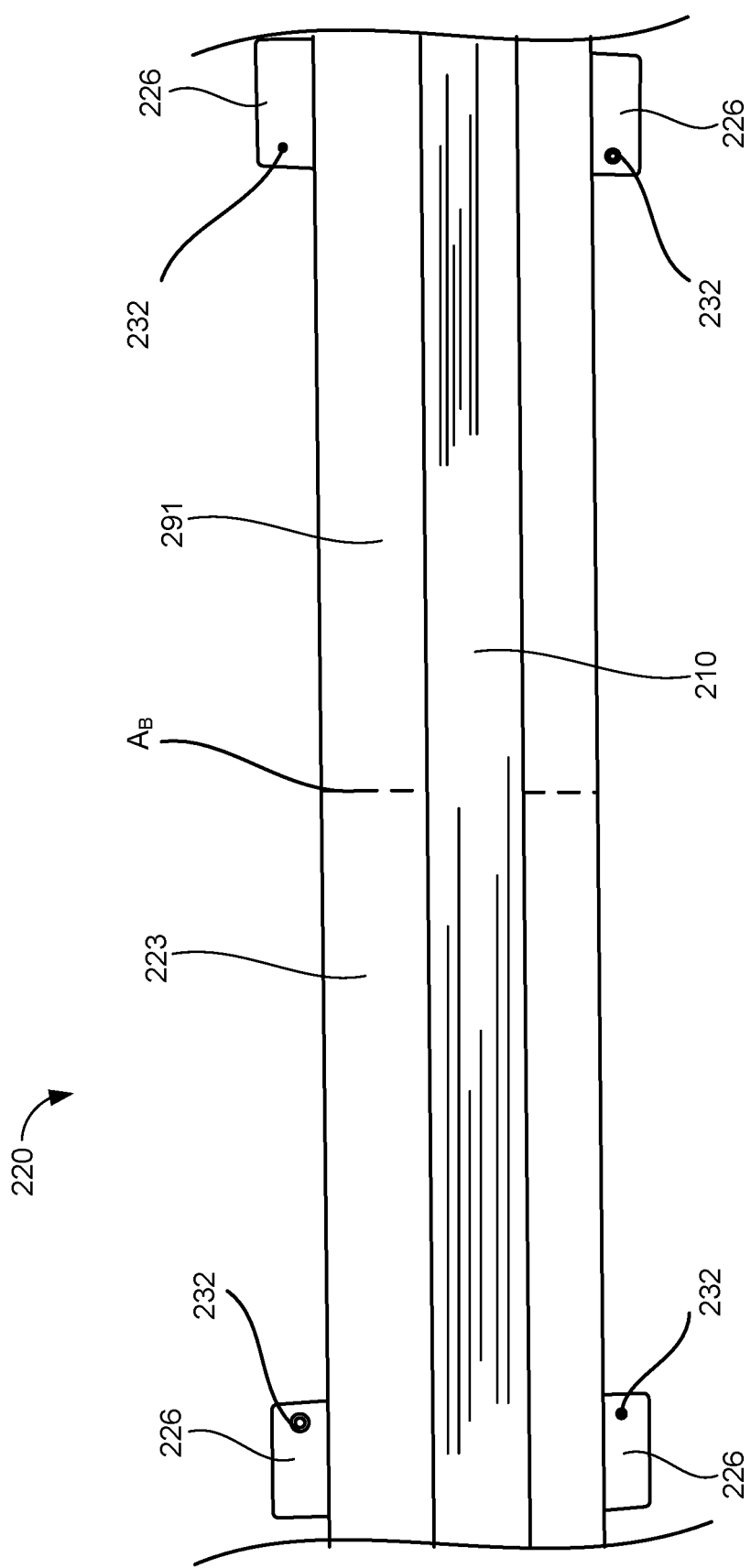
FIG. 13 is a bottom view of the central portion of the bracket assembly shown in FIGS. 6-12 with a light tube installed.

The second end portion 222 defines a longitudinal axis $A_2$ (see, e.g., FIGS. 15 and 16) that is substantially normal to the vertical (or lateral) edge 230, and includes (or is coupled to a second set of sockets 265. Similar to the first end portion 221, as shown in FIGS. 11 and 12, the vertical edge 230 of the second end portion 222 defines a series of indentations 228 and corresponding mounting holes 231. Each socket 265 is mounted within one of the indentations 228, and is retained in place by a protrusion or clip that is locked within the mounting hole 231. In other embodiments, the second sockets 265 can be coupled to the second end portion 222 of the bracket 220 by any suitable mechanism. For example, in some embodiments, the second socket 265 can be coupled to the second end portion 222 by a mechanical fastener (e.g., a screw, a clip, or the like), by an interference fit (e.g., within an opening defined by the bracket 220), by an adhesive, or by a weld joint. Because the sockets 265 are coupled to the second end portion 222 of the bracket 220, the sockets 265 mechanically support a second end portion 212 of the LED light assembly 210.

As shown, the second end portion 222 does not provide an electrical connection between a power source (not shown) and the LED light assembly 210 and/or does not include any electronic components nor other wiring of the electronics assembly 260. Thus, the second socket 265 provides only mechanical support to retain the LED light assembly 210 in the desired position (e.g., between the first socket 264 and the second socket 265). In other embodiments, however, the second sockets 265 can also be electrically coupled and/or provide power to the LED light assembly 210. The second sockets 265 (and any of the sockets described herein) can be suitable socket, such as a pre-wired socket that can hold a standard T8 LED light tube. In some embodiments, the second sockets 265 (and any of the sockets described herein) can be a BJB model 26.292 series push through lamp holder (e.g., model 26.292.1111.50) or a LEVITON 13661-SWP lamp holder. Similar to that described above for bracket assembly 190, the bracket assembly 290 can include any number of sockets, each configured to support an end portion of a LED light assembly, and the second end portion 222 may be configured to accept the additional sockets within the indentations 228.

Figure 7:
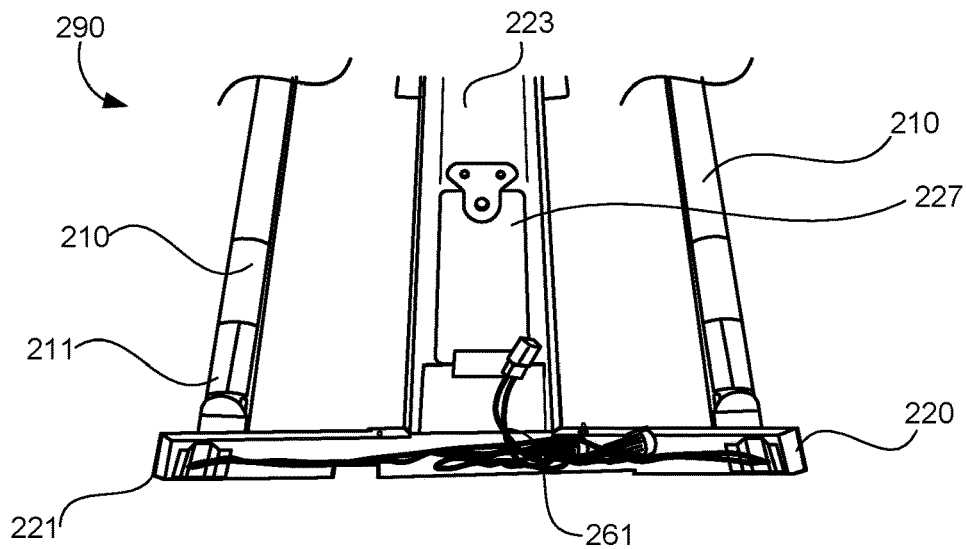
Figure 14:
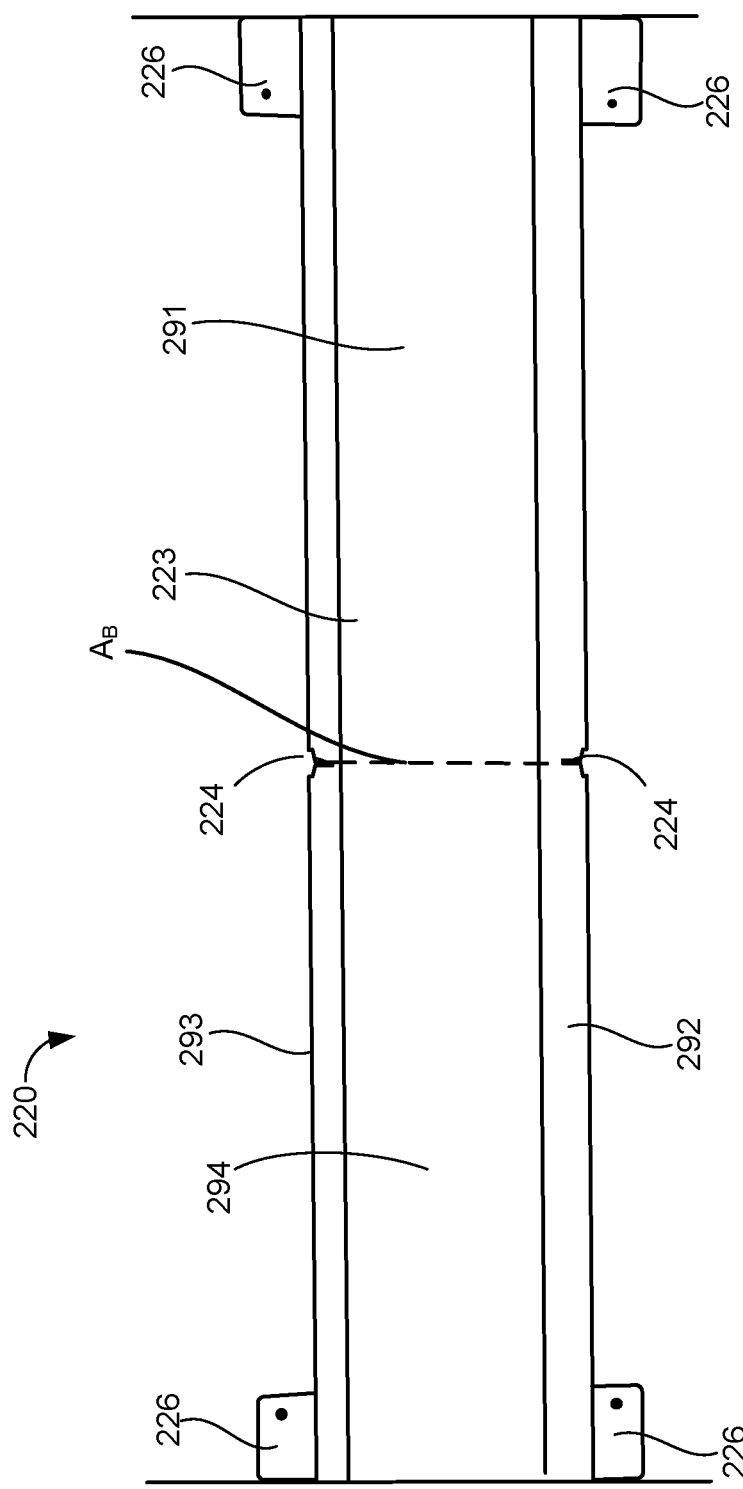
FIG. 14 is a top view of the central portion of the bracket assembly shown in FIGS. 6-12.
Figure 16:
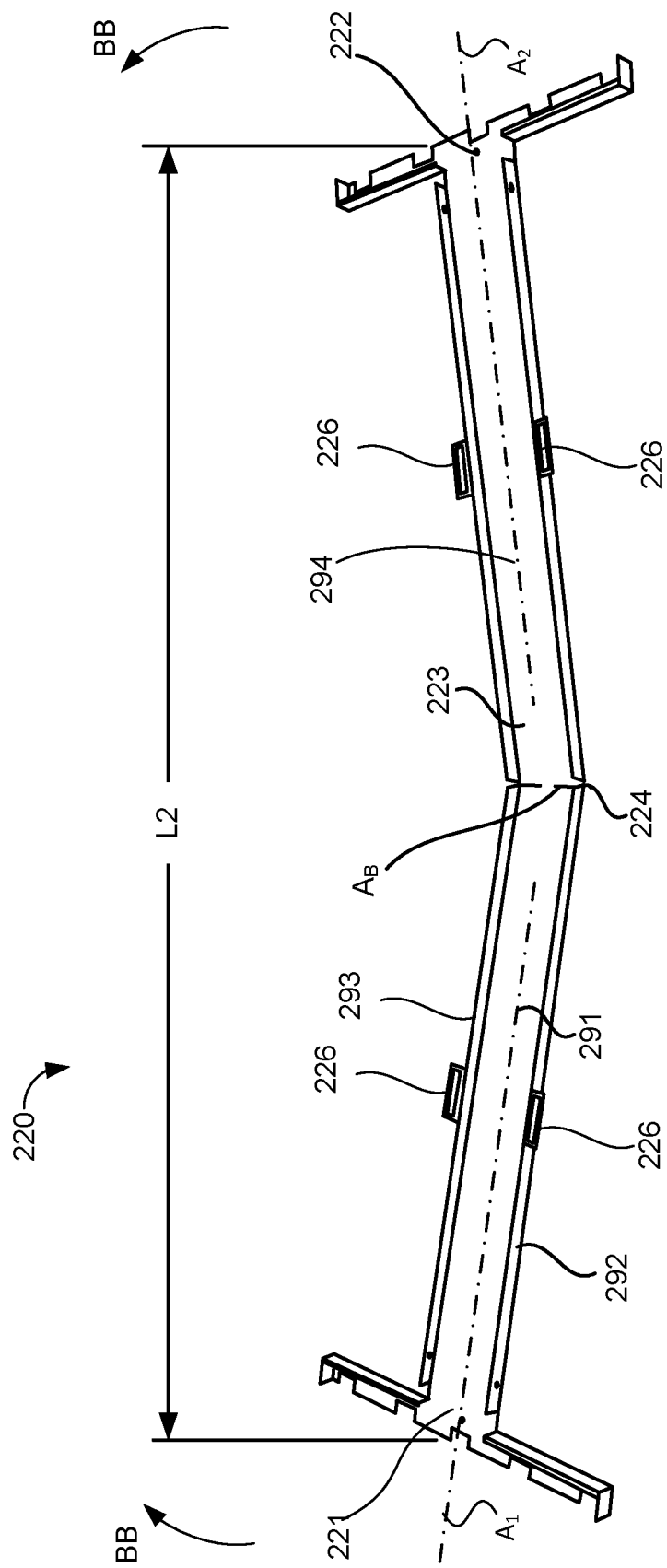

The central portion 223 connecting the first end portion 221 to the second end portion 222 defines bend axis n $A_B$ (see, e.g., FIGS. 13-16). Referring to FIGS. 14-16, the central portion 223 includes a first wall 291, a second wall 292, and a third wall 293. The first wall 291 connects the first end portion 221 to the second end portion 222. The second wall 292 and the third wall 293 are each attached to the first wall 291, with the second wall 292 being opposite the third wall 293. Collectively, the first wall 291, the second wall 292, and the third wall 293 define a channel 294. In some embodiments, the channel 294 can contain the optionally included electronics assembly 260 or any other components of the bracket assembly 290. In this manner, when the bracket assembly 290 is installed, such components can be covered and/or maintained in the enclosed channel. As shown in FIGS. 7-9, the bracket 220 also includes an access panel 227 movably coupled about an access opening 237. The access panel can provide access to the enclosed channel 294 without requiring that the bracket assembly 290 be removed from the inner surface of the troffer. For example, in some embodiments, the electronics assembly 260 (including the wiring or connectors) can be accessed for service or replacement after the bracket assembly has been installed, and without requiring removal of a portion of the bracket assembly 290. In some embodiments, the access panel is secured by a fastener 225 as shown in FIG. 9. Some embodiments will include will include a pre-attached safety label 270 affixed near the access panel 227, though the label may be placed at any desired location along the bracket 220.

Figure 17:
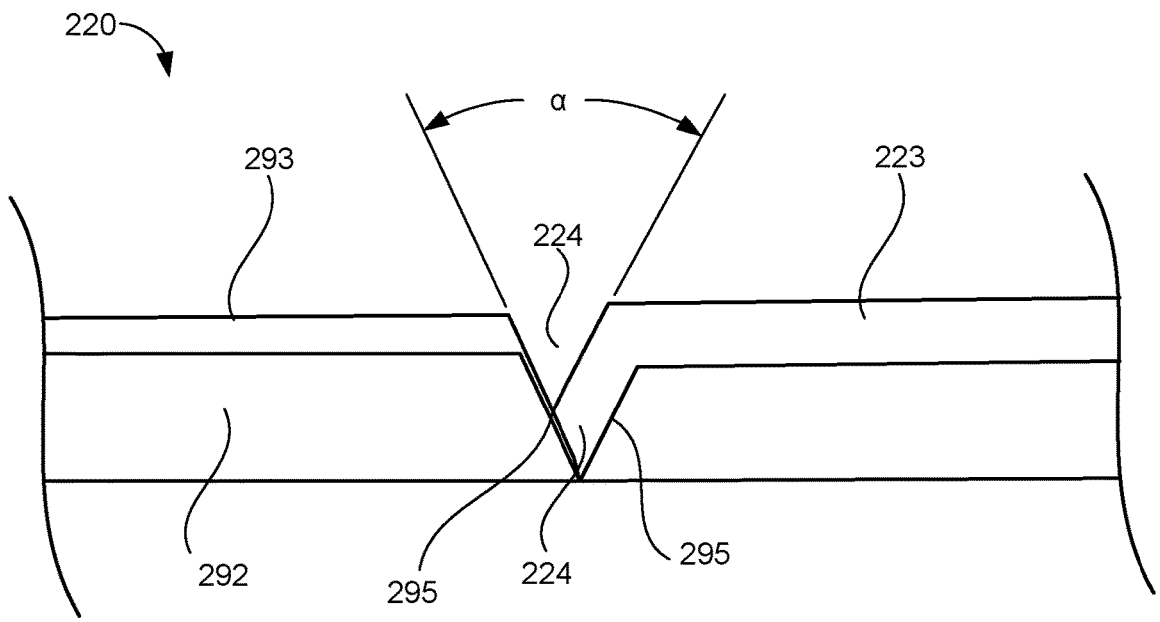
FIGS. 17 and 18 are enlarged front views of the central portion of the bracket shown in FIGS. 15 and 16, showing a notch.
Figure 18:
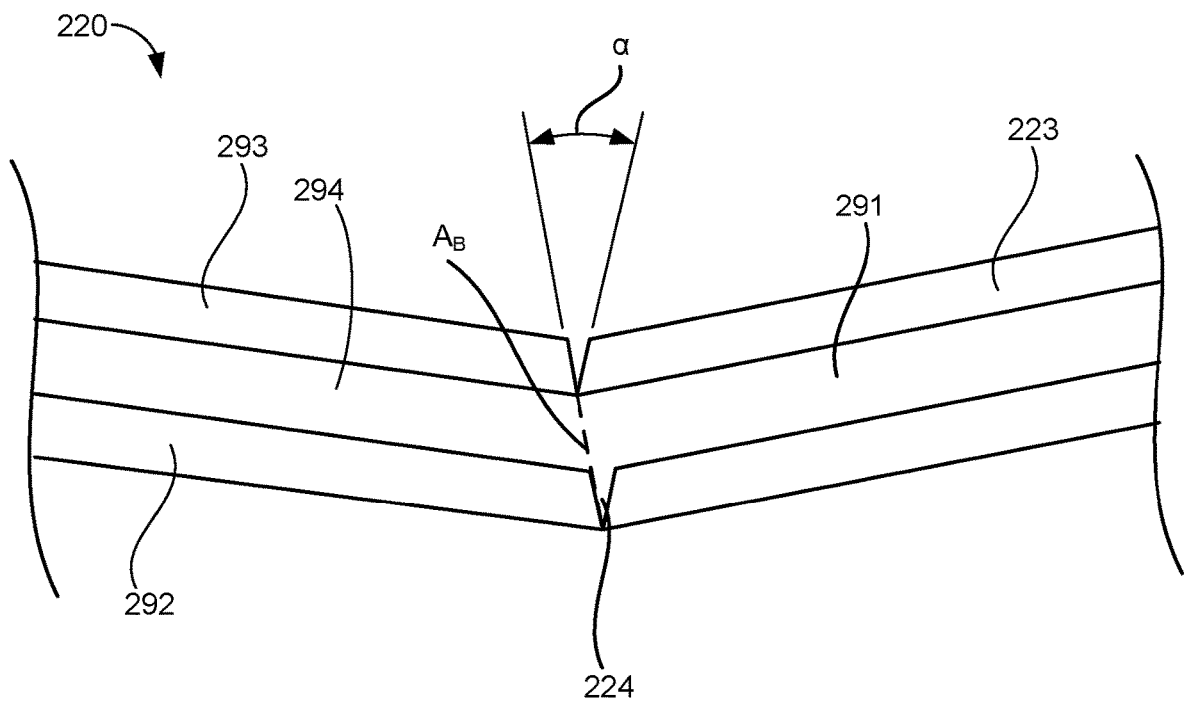

As shown, each of the second wall 292 and the third wall 293 defines a notch 224 that facilitates bending or deforming of the central portion 223 and/or the bracket 220 along the bend axis $A_B$. Thus, the notches 224 are aligned with the bend axis $A_B$. As illustrated in FIGS. 17 and 18, the notch 224 has a "V" shape defined by opposing edges 295 of the selected wall section, and defines a notch angle α. The notch angle α can have any suitable value to facilitate deformation at the bend axis $A_B$. For example, in some embodiments, the notch angle α can be up to about 45 degrees. In other embodiments, the notch angle α can be between about 15 degrees and about 30 degrees. Moreover, although the notches 224 are shown as having a specific shape, in other embodiments, the second wall 292 and/or the third wall 293 can include any opening or cut therein. Such openings can be any shape including, but not limited to, a cut in the wall section, a "U" shaped void, or a void where the opposing edges 295 each form about a 90-degree angle with the first wall 291. In some embodiments, the configuration for deformation may not include a notch, but rather may rely on the inclusion of a stress point, such as may be created by the reducing the thickness of the material from which the central portion is constructed at the bend axis $A_B$. In still other embodiments, the first wall 291 may include perforations positioned to facilitate deformation at the bend axis $A_B$ when the bracket assembly 290 is transitioned from the first configuration to the second configuration.

In some embodiments, the second wall 292 and the third wall 293 may be configured to be essentially perpendicular to the first wall 291, but in other embodiments, the walls may be at any selected angle and it is not necessary that they be congruent. Although the second wall 292 and the third wall 293 are shown as being attached to the first wall 291 along outer edges of the first wall 291 (See FIG. 15), in other embodiments, the second wall 292 and the third wall 293 may be attached to the first wall 291 at any suitable location across the first wall 291. In some embodiments, the second wall 292 and the third wall 293 may be shorter than the first wall 291, and each of the three walls may be a different length. In yet other embodiments, the central portion 223 need not include the second wall 292 and/or the third wall 293, and need not define a channel.

The central portion 223 is configured such that the second end portion 222 can move relative to the first end portion 221. This movement enables the bracket assembly 290 to transition between a first configuration, as shown in FIG. 15, and a second configuration as shown in FIG. 16. When the bracket assembly 290 is in the first configuration, the bracket assembly 290 has a first length $L_1$ as shown in FIG. 15. In the first configuration, the distance between the first socket 264 and the second socket 265 is defined by and/or is consistent with the length of the LED light assembly 210. In this manner, when the bracket assembly 290 is in the first configuration, the LED light assembly 210 can be coupled to (and between) the first socket 264 and the second socket 265. In some embodiments, the LED light assembly 210 includes a T8 LED light tube. Additionally, when the bracket assembly 290 is in the first configuration, the longitudinal axis $A_1$ of the first end portion 221 and the longitudinal axis $A_2$ of the second end portion 222 are substantially coaxial. Said another way, the longitudinal axis $A_1$ of the first end portion 221 and the longitudinal axis $A_2$ of the second end portion 222 define a first bracket angle that is about 180 degrees.

When the bracket assembly 290 is in the second configuration, the bracket assembly 290 has a second length $L_2$ as shown in FIG. 16, which is less than the first length $L_1$. Additionally, the second length $L_2$ is less than a length $L_t$ of the opening 106 into the troffer 100 shown in FIG. 3. In this manner, when the bracket assembly 290 is in the second configuration, the bracket assembly 290 can fit through the opening 106 defined by the lip 104 of the troffer 100. Additionally, when the bracket assembly 290 is in the second configuration, the longitudinal axis $A_1$ of the first end portion 221 and the longitudinal axis $A_2$ of the second end portion 222 form a second bracket angle (not shown, but see, e.g., FIG. 3 showing the bracket angle θ). The second bracket angle can be any suitable angle. For example, in some embodiments, the second bracket angle is less than about 170 degrees.

In use, prior to installation, the bracket assembly 290 can be transitioned from the first configuration (FIG. 15) to the second configuration (FIG. 16), with the second bracket angle θ being less than about 170 degrees. To transition the bracket assembly 290 from the first configuration to the second configuration, a rotational force is applied, as indicated by the arrows BB in FIG. 16, to the bracket assembly 290 so that the first end portion 221 and the second end portion 222 of the bracket assembly 290 are brought closer together and the second length $L_2$ is established. Similar to that described above for bracket assembly 190 and shown in FIGS. 3-5, for instances involving mounting the bracket assembly in a troffer, the establishment of the second length $L_2$ will enable the bracket assembly 290 to be inserted past the surrounding lip 104.

The first end portion 221 can be moved towards the second end portion 222 in any suitable manner. For example, in this embodiment, the central portion 223 is configured to deform about the bend axis $A_B$ when the bracket assembly 290 is transitioned between the first configuration and the second configuration, as illustrated in FIGS. 15-16. In other embodiments, however, a bracket can deform about any other suitable location or axis. In yet other embodiments, a bracket can deform about multiple different axes.

After the bracket assembly 290 is in the second configuration, the bracket assembly can be moved (in a similar manner as shown by the arrow F in FIGS. 3-4) through a troffer opening (e.g., the troffer opening 106) and into contact with the mounting surface. The continued exertion of an upward force will return the bracket assembly 290 towards the first configuration. In some embodiments, the upward force can be applied at or near the bend axis $A_B$, thereby urging the bracket assembly 290 back towards the first configuration when the first end portion 221 and the second end portion 222 are in contact with an upper surface of the troffer. Because the upward force is applied at the central portion 223, it can be applied with a single hand.

After the bracket assembly 290 has returned to the first configuration, the bracket assembly 290 can be fastened inside the troffer 100 using any suitable mechanism. For example, as shown, the bracket 220 includes with a series of mounting flanges 226 defining mounting holes 232. In some embodiments, a series of fasteners (e.g., screws) can be captively fastened within the holes 232. Thus, a user can support the bracket assembly 290 by applying an upward force about the bend axis $A_B$ with a first hand, while installing the captive fasteners to secure the flanges 226 to the mounting surface with a second hand.

As described briefly above, in some embodiments, the bracket assembly 290 can include the electronics assembly 260. The electronics assembly 260 includes the wiring 261 that is coupled to the sockets 264 and the power connector 262. This arrangement allows the bracket assembly 290 to be easily coupled to a power source (not shown), such an A/C power source. In some embodiments, the electronics assembly 260 includes a second connector (not shown) that is matingly coupled to the connector 262. In use, the mating connector is removed from the connector 262 and coupled to the power line within the troffer (not shown). Then, during installation the mating connector (coupled to the power line) can be recoupled to the connector 262, thereby providing an efficient manner for electrically coupling the bracket assembly 290 to the power source. In other embodiments, however, the electronics assembly need not include these components. In still other embodiments, the electronics assembly 260 can include a wireless controller configured to receive a wireless communications signal and adjust power supplied to the first socket via the power source in response to the wireless communication signal. In still other embodiments, the electronics assembly 260 can include a timer, dimmer, or any other electronic device to enhance the functionality of the lighting assembly.

Figure 19:
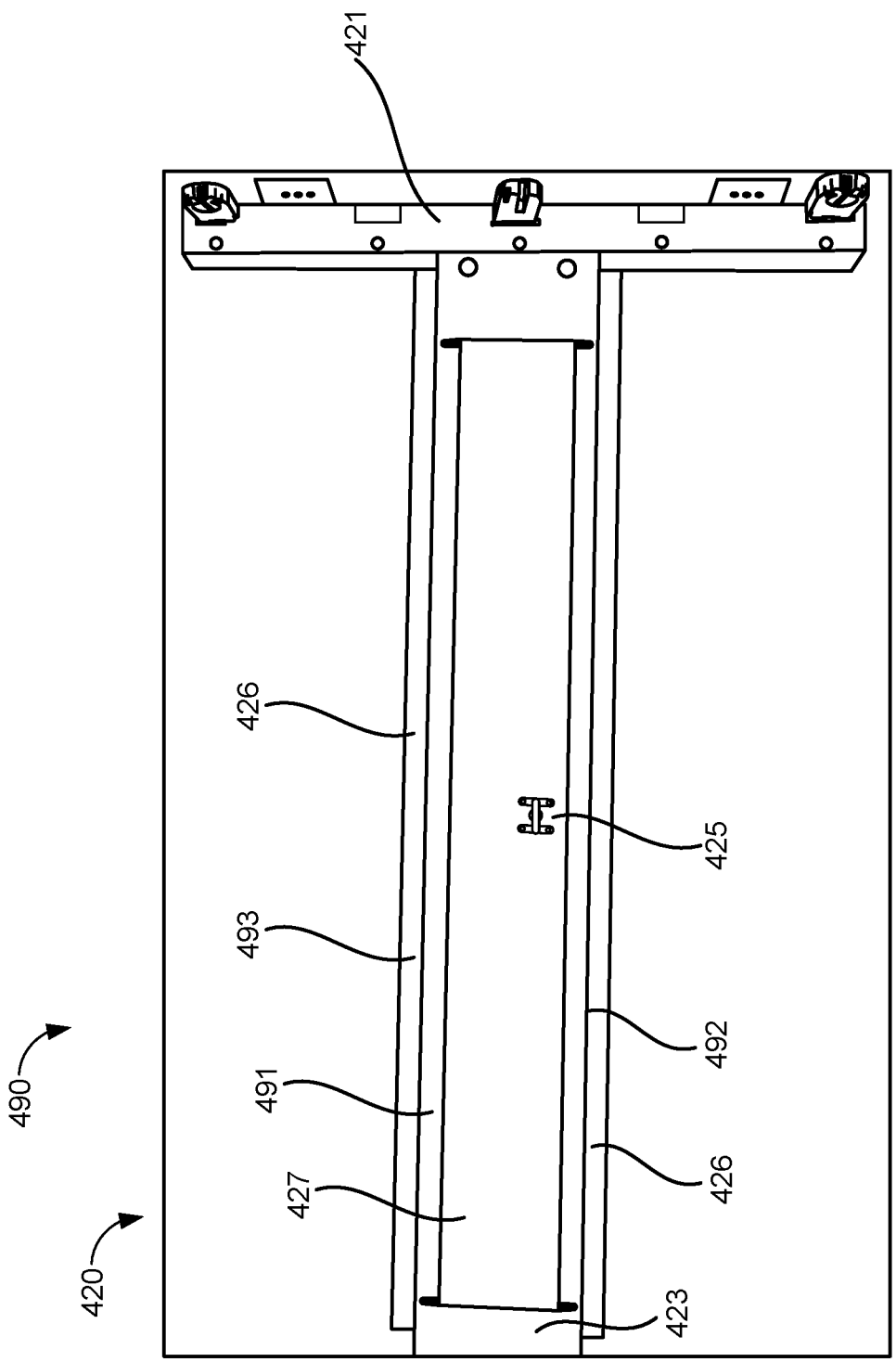
FIG. 19 is a bottom view of a portion of a bracket of a bracket assembly, according to an embodiment.
Figure 20:
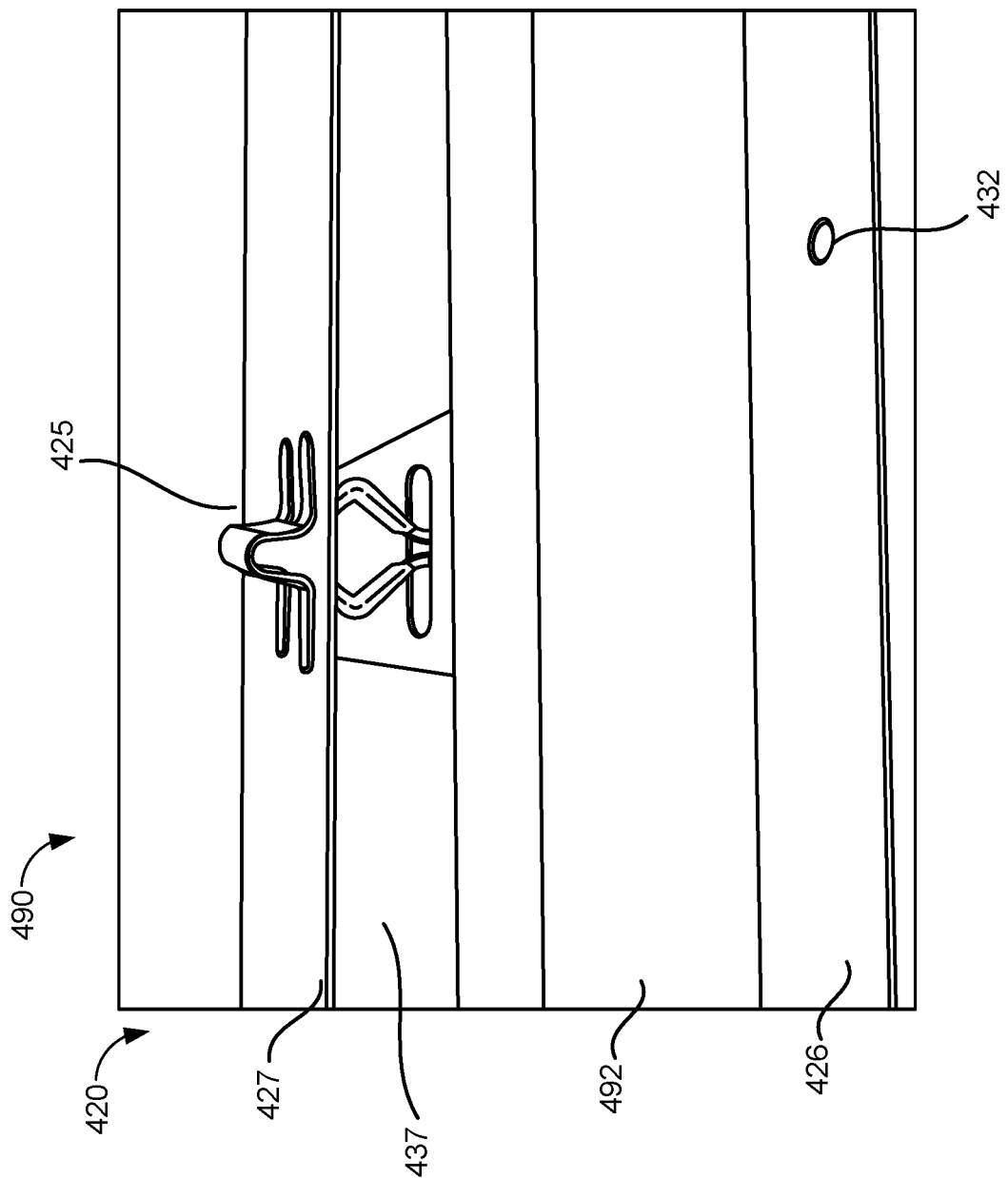
FIG. 20 is an enlarged front view of a portion of the bracket shown in FIG. 19, showing an access panel in an open configuration.
Figure 21:
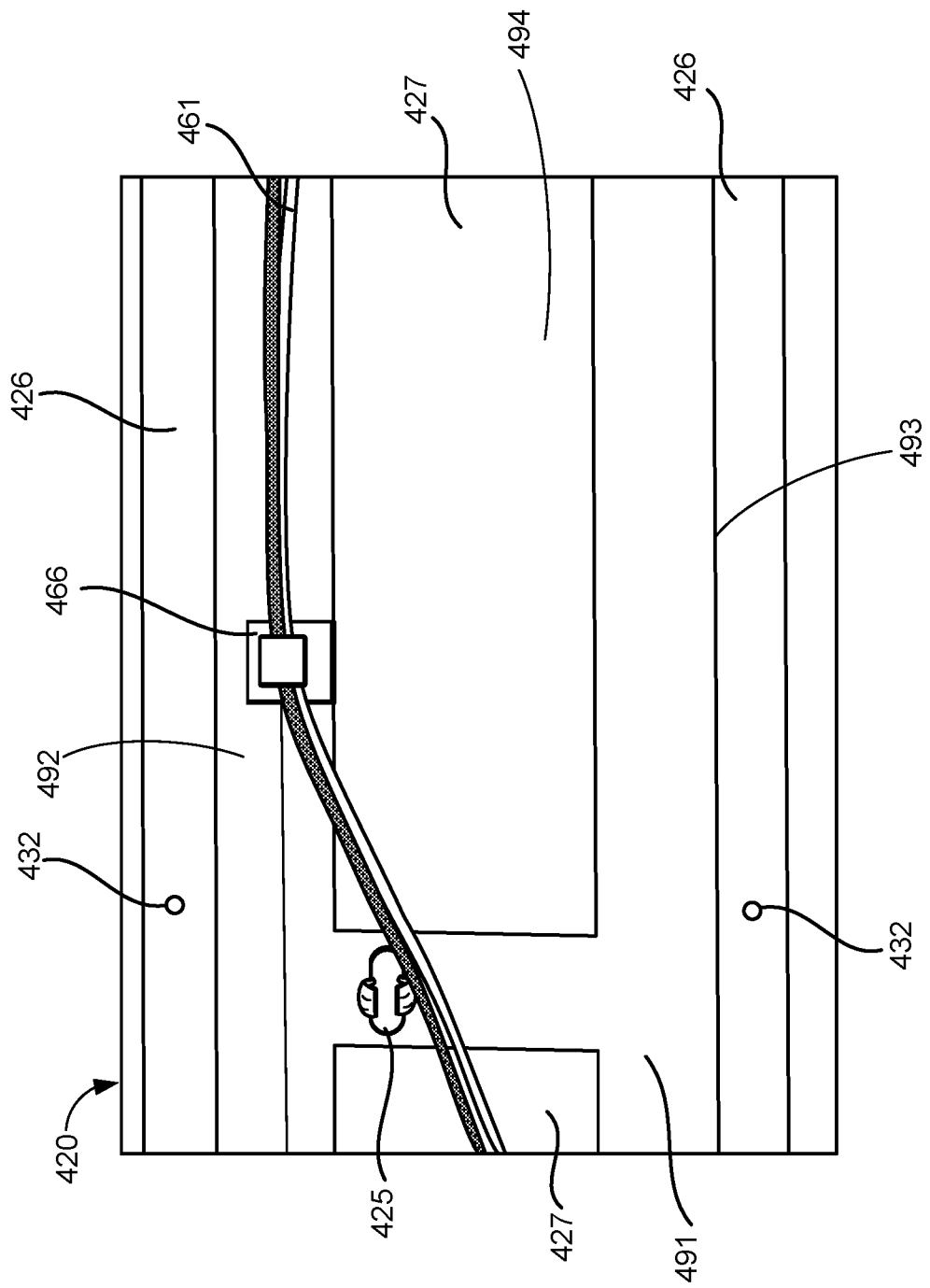
FIG. 21 is a top view of a portion of the bracket shown in FIGS. 19 and 20, showing a portion of an electrical assembly coupled to the bracket.

Although the bracket 220 is shown and described as including a series of mounting flanges 226, in other embodiments, a bracket can include any suitable mounting portion and/or flange configuration. For example, in some embodiments, a bracket can include elongated flanges. Moreover, in some embodiments, a bracket can include any suitable access panel, wiring arrangement, or the like. For example, FIGS. 19-21 show a bracket assembly 490 according to an embodiment. The bracket assembly 490 includes a bracket 420 including a first end portion 421, a second end portion, and a central portion 423. The bracket assembly 490 is similar in many respects to the bracket assembly 290 described above, and therefore certain aspects (e.g., sockets, wiring, etc.) are not described in detail below.

The central portion 423 of the bracket 420 includes a deformable portion, similar to that defined by the notches 224 and/or bend axis $A_B$ described above, which allows the bracket 420 to bend between a first configuration and a second configuration. In this manner, similar to that described above for bracket assembly 290, the central portion 423 provides the flexibility to clear the outer lip of a troffer (e.g., the outer lip 104) so that the bracket 420 may be mounted into an existing light fixture, as described herein. As shown, the central portion 423 includes a first wall 491, a second wall 492, and a third wall 493. The first wall 491 connects the first end portion 421 to the second end portion (not shown). The second wall 492 and the third wall 493 are each attached to the first wall 491, with the second wall 492 being opposite the third wall 493. Collectively, the first wall 491, the second wall 492, and the third wall 493 define a channel 494. In some embodiments, the channel 494 can contain any optionally included electronics components, such as the wiring 461, a retention clip 466, or any other components of the types shown and described herein. In this manner, when the bracket assembly 490 is installed, such components can be covered and/or maintained in the enclosed channel.

In some embodiments, the bracket 420 also includes an access panel 427 movably coupled about an access opening 437. The access panel can provide access to the enclosed channel. In some embodiments, the access panel is secured by a fastener 425 as shown in FIG. 20. The access panel 427 can be of any suitable length, and can have any suitable mechanism for "opening" or allowing access after the bracket 420 has been installed. In this manner, the electronics assembly (including the wiring or connectors) can be accessed for service or replacement after the bracket 420 has been installed, and without requiring removal of a portion of the bracket 420. In some embodiments, the access panel 427 extends from the first end portion 421 of the bracket to the central portion 423 of the bracket 420. In some embodiments, the access panel 427 is secured by a screw, retention clip, magnet or other means. In some embodiments, the access panel 427 is secured by a quarter-turn fastener 425 (FIGS. 19-20), which allows for tool-less maintenance of the light assembly once the bracket assembly 490 is installed. The quarter-turn fastener 425 has a clip that fits through a hole in the cover of the access panel 427 and the bracket 420, and is locked into place with a quarter turn.

The bracket 420 includes two flanges 426. As shown in FIG. 19, the flanges 426 are elongated and extend along the bracket 420 from the first end portion 421 to a break point within the central portion 423, and from break point to the second end portion (not shown). The break point can be, for example, adjacent a notch, bend axis or the like (not shown). As shown in FIG. 20, the flanges 426 are formed with mounting holes 432. In some embodiments, captive fasteners (not shown, but similar to the captive fasteners 333 shown and described with reference to FIG. 24) are preloaded and employed to secure the bracket 420 within the troffer.

Figure 22:
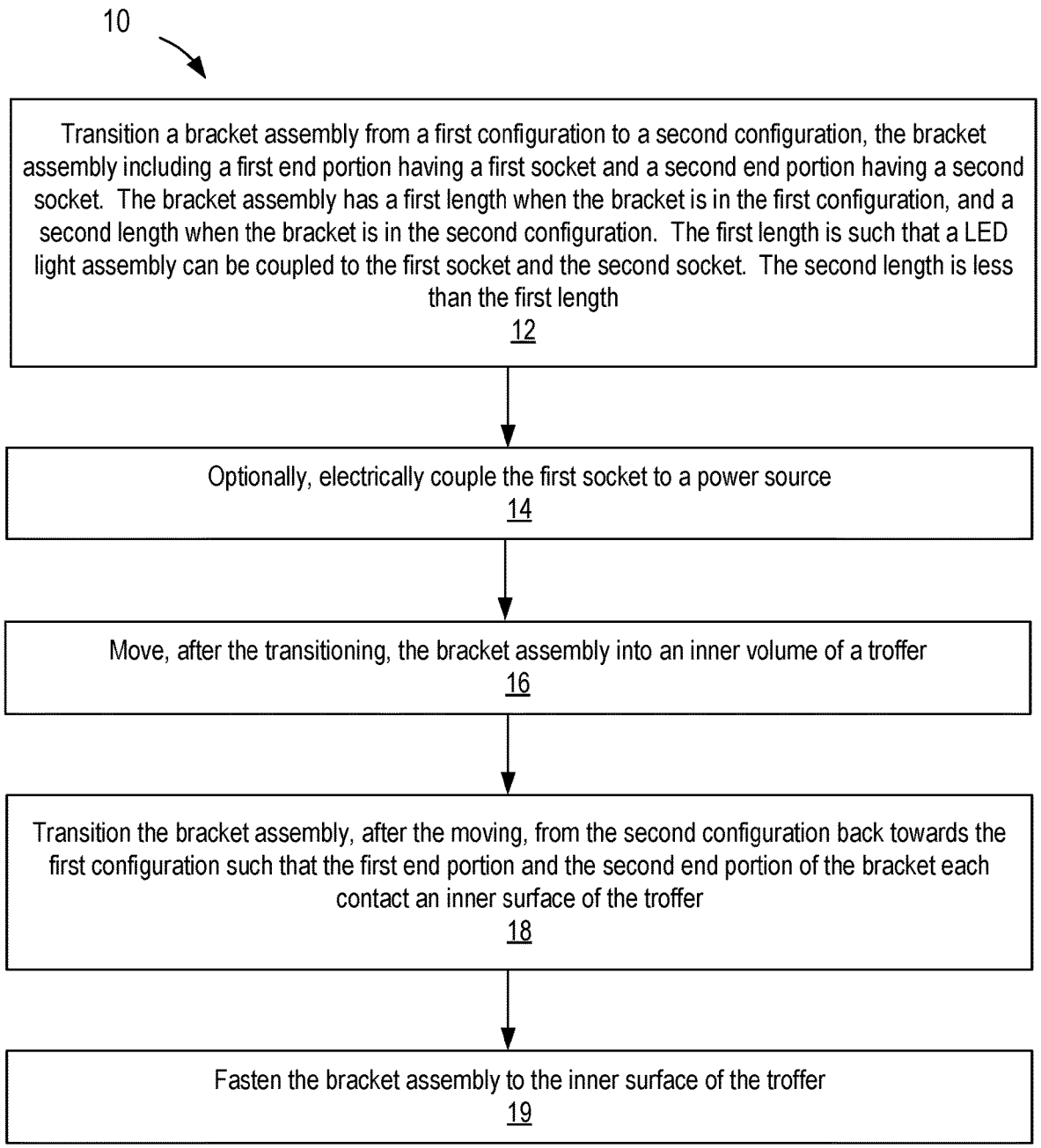
FIG. 22 is a flow chart of a method of converting a lighting fixture from a fluorescent lighting fixture to a LED lighting fixture according to an embodiment.

FIG. 22 illustrates a method 10 of installing a LED lighting fixture according to an embodiment. Although the method 10 is described in conjunction with the bracket assembly 290 shown and described above, in other embodiments, the method 10 can be performed using any suitable bracket assembly described herein. The method includes transitioning a bracket assembly from a first configuration to a second configuration, at 12. The bracket assembly can be, for example, the bracket assembly 290, and includes a first end portion (e.g., the first end portion 221) having a first socket (e.g., the first socket 264) and a second end portion (e.g., the second end portion 222) having a second socket (e.g., the second socket 265). The bracket assembly has a first length when the bracket is in the first configuration, and a second length when the bracket is in the second configuration. The first length is such that a LED light assembly (e.g., the light assembly 210) can be coupled to the first socket and the second socket. The second length is less than the first length.

In some embodiments, the method 10 optionally includes electrically coupling the first socket to a power source, at 14. The coupling can be performed, for example, by coupling a connector (e.g., the connector 262) to a mating connector on an A/C power line. In some embodiments, the mating connector can be included as part of the retrofit kit.

Once the bracket assembly is transitioned to a second configuration, the bracket assembly is moved into an inner volume of a troffer, at 16. By moving the bracket assembly into the troffer when the bracket assembly is in its second configuration, the length of the bracket assembly can be less than a length of an opening into the troffer. Thus, the bracket assembly can pass into the opening easily. In some embodiments, the bracket assembly is moved into the inner volume with a single hand.

The bracket assembly is then transitioned from the second configuration back towards the first configuration such that the first end portion and the second end portion of the bracket each contact an inner surface of the troffer, at 18. In some embodiments, transitioning the bracket assembly from the first configuration to the second configuration includes bending a central portion of the bracket assembly. For example, in some embodiments, the central portion defines at least one of a perforation, a notch (e.g., the notch 224), or an opening, and the central portion can be deformed by applying a force about the perforation, notch or opening.

Upon reestablishing the first configuration, the bracket assembly is fastened to the inner surface of the troffer, at 19. In some embodiments, the bracket assembly can include a series of flanges or mounting surfaces (e.g., the flanges 226) to which a series of fasteners are captively coupled, as described herein. In such embodiments, the captive fasteners can be coupled to the surface of the troffer. In some embodiments, a user can support the bracket assembly by applying an upward force with a first hand, while installing the captive fasteners to secure the flanges to the mounting surface with a second hand.

FIG. 23 illustrates a method 20 of installing a LED lighting fixture, according to an embodiment. The method includes removing the existing lighting components from within the troffer, at 22. This includes disconnecting power to the lighting fixture and removing a fluorescent light component from a troffer of the lighting fixture. Removing the fluorescent light component may include removing a fluorescent light tube from within the troffer, removing a wire cover from within the troffer, removing a fluorescent light bracket, removing any fluorescent lamp sockets from within the troffer, and removing a ballast from within the troffer. Removing a ballast will expose an incoming power line. After the removal of the fluorescent light components, an electrical connector is coupled to the incoming power line.

A retrofit bracket assembly of the types shown and described herein (e.g., the bracket assembly 290) is then installed into the troffer, at 24. This can include preparing the A/C power line to be coupled the electronics assembly (e.g., the electronics assembly 260) of the bracket assembly. For example, a male end of a quick disconnect fitting can be removed from the female end (e.g., the connector 262) coupled to the electronics assembly. The male end can be coupled to the power line.

The bracket assembly is then positioned so that a first socket attached to a first end portion of the bracket assembly and a second socket attached to a second end portion of the bracket assembly are oriented downward, at 24B. The bracket assembly is bent in a first direction about a transition point in a central portion of the bracket assembly until a bracket length between the first end portion and the second end portion less than an opening length of an opening into the troffer (see 24C). The electrical connector is then connected to the corresponding electronic connector (e.g., connector 262) of the bracket assembly. The bent bracket is then moved into the troffer. Once the first end portion and the second end portion are each in contact with an inner surface of the troffer, a force is exerted on the central portion of the bracket assembly. The force is sufficient to bend the bracket assembly in a second direction. Once this is accomplished, captive fasteners are moved into the inner surface of the troffer, securing the bracket assembly.

In some embodiments, the bracket 220 (and any of the brackets described herein) can be monolithically constructed. In other embodiments, however, the bracket 120 (and any of the brackets described herein) may be formed from separately-constructed components. For example, FIGS. 24-37 show illustrations of a bracket assembly 390, according to an embodiment, which is not monolithically constructed. The bracket assembly 390 contains the electrical wiring 361 and sockets (the sockets 364, 365) for converting an existing fluorescent lighting fixture into a LED lighting fixture. As described herein, the bracket assembly 390 can transition between a first configuration (see FIG. 33) and a second configuration (see FIG. 31) to facilitate installation of the bracket assembly 390. For example, in some embodiments the bracket assembly 390 can be coupled about a strip mounting fixture, and can accommodate LED light tubes arranged in an end-to-end arrangement.

Figure 24:
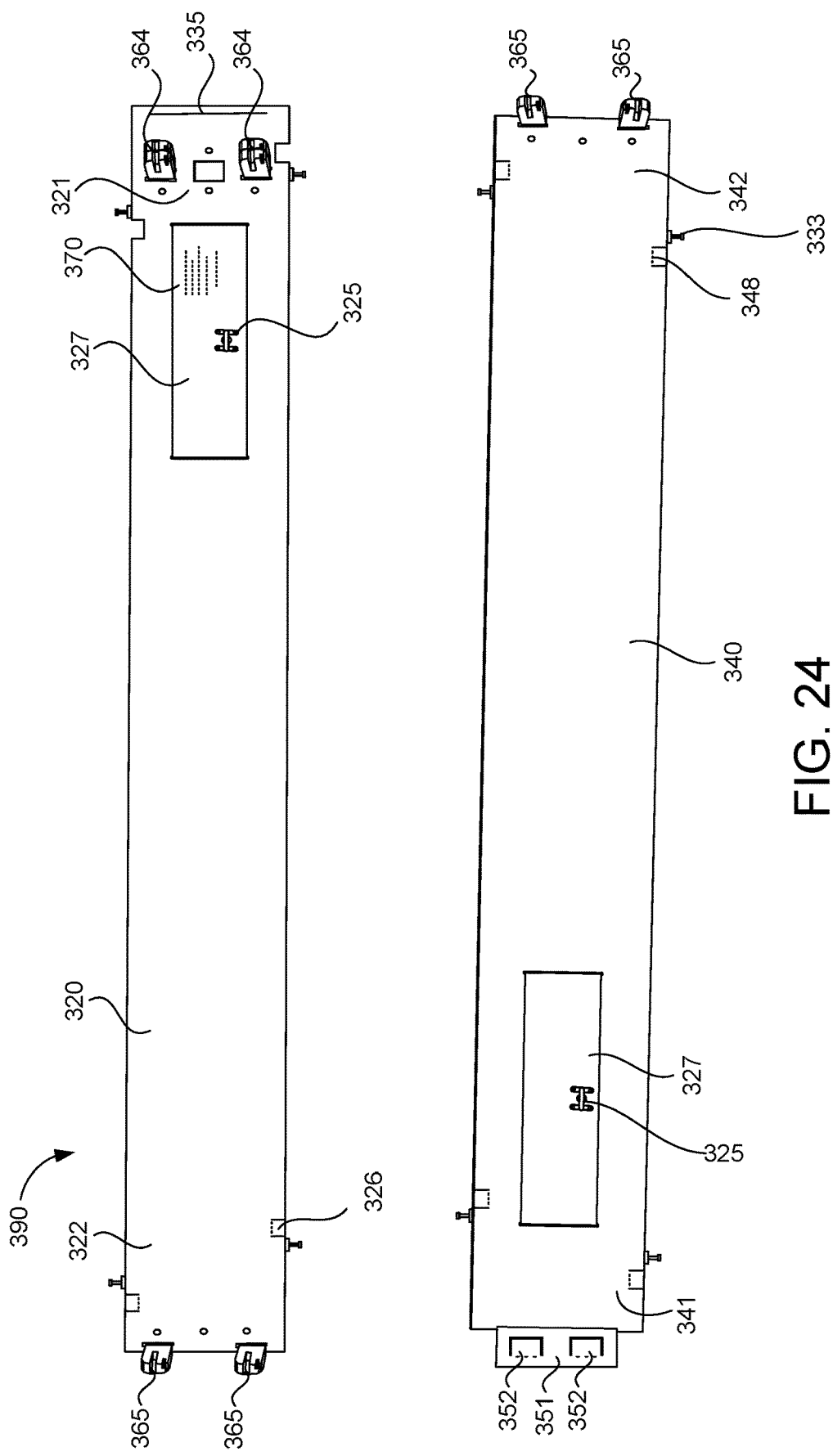
FIG. 24 is a bottom view of a bracket assembly according to an embodiment.

As shown in FIG. 24, the bracket assembly 390 has a first bracket member 320 and a second bracket member 340. The first bracket member 320 is a separately constructed member than the second bracket member 340. As described herein, the second bracket member 340 can be coupled to the first bracket member 320 during an installation operation. Moreover, the second bracket member 340 is configured to rotate relative to the first bracket member 320 between a first position and a second position. This arrangement facilitates installation of the bracket assembly 340 by a single user.

Figure 25:
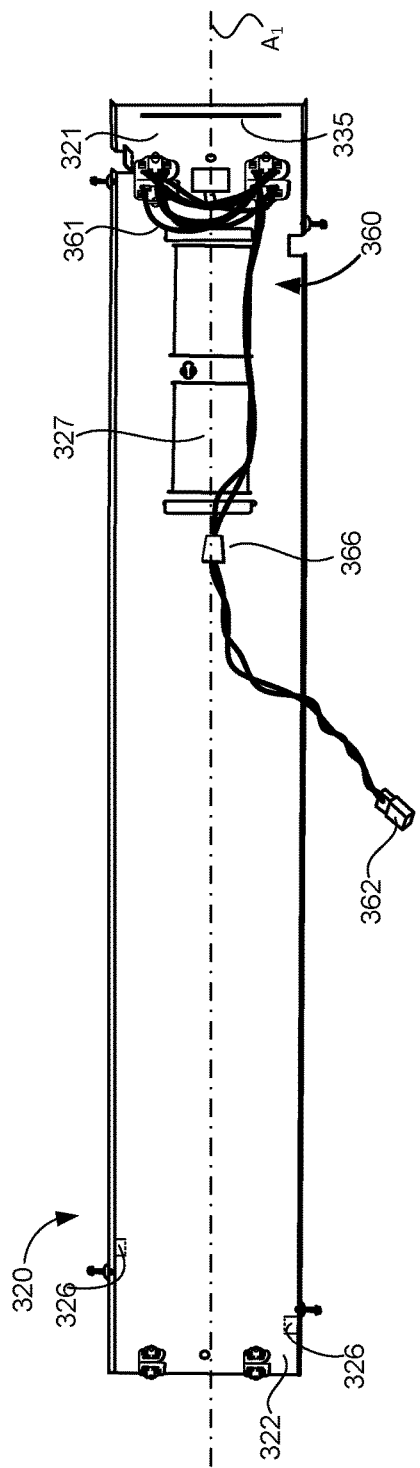
FIG. 25 is a top view of a first bracket of the bracket assembly shown in FIG. 24.
Figure 26:
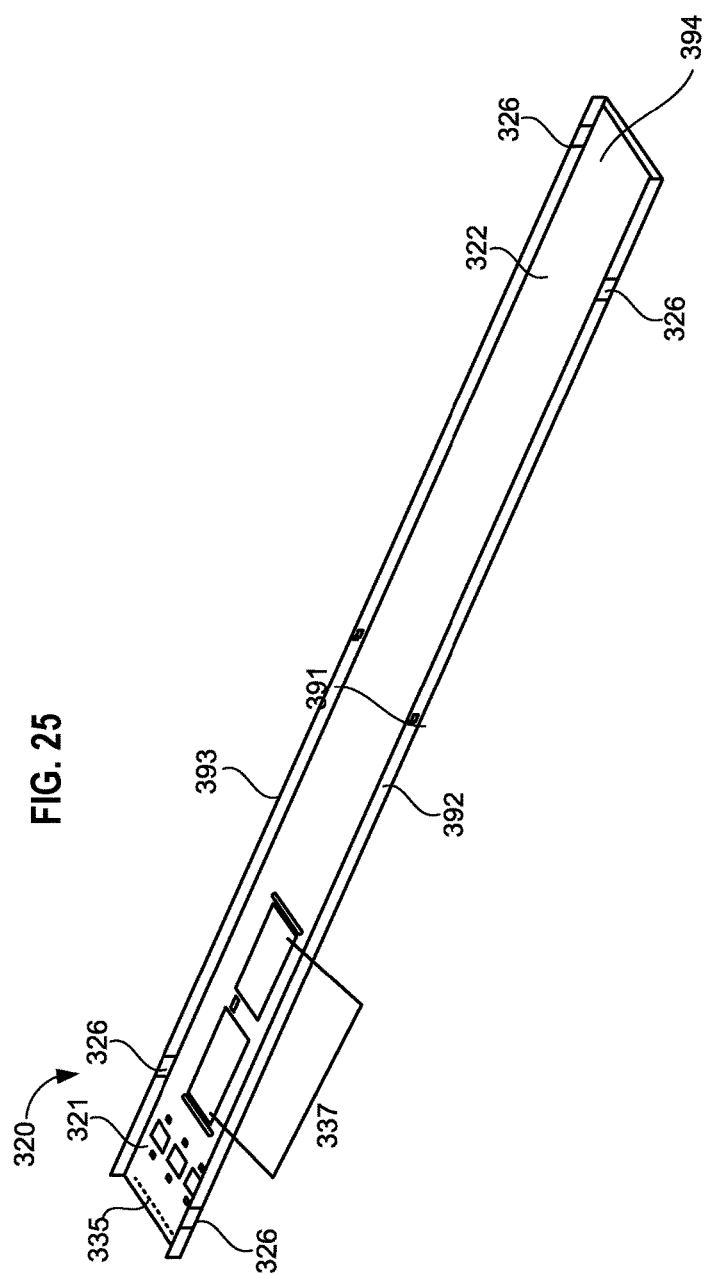
FIG. 26 is a side perspective view of a first bracket of the bracket assembly shown in FIG. 24.
Figure 27:
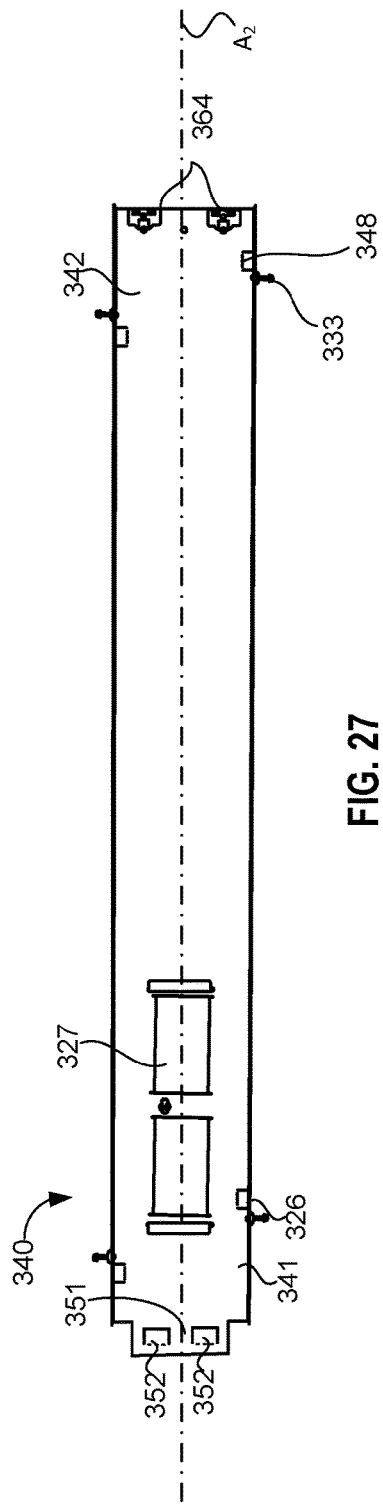
FIG. 27 is a bottom view of a second bracket of the bracket assembly shown in FIG. 24.
Figure 28:
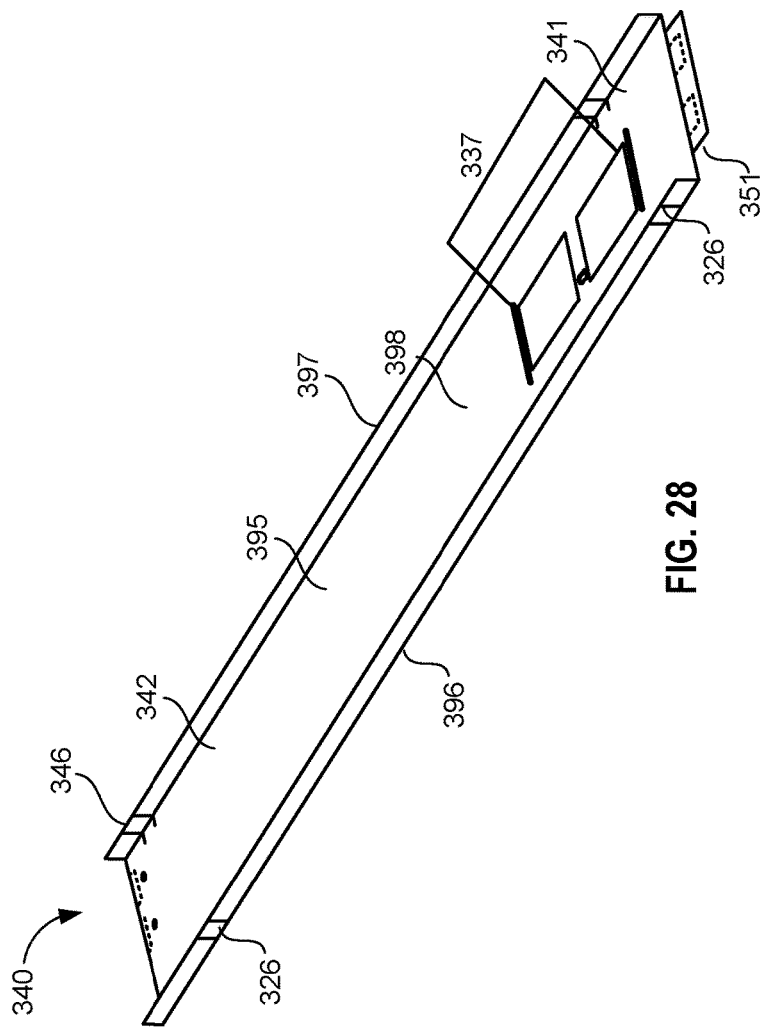
FIG. 28 is a side perspective view of a second bracket of the bracket assembly shown in FIG. 24.

The first bracket member 320 defines a longitudinal axis $A_1$ (FIG. 25 showing the axis $A_1$) and includes a first end portion 321 and a second end portion 322. The first end portion 321 of the first bracket member 320 includes a first connector portion 335 and a series of first sockets 364 configured to be electrically coupled to a LED light assembly, similar to that described above for bracket assemblies 190 and 290. As shown, the first connector portion 335 is a slot within which the tabs 352 of the second connector portion 351 (of the second bracket member 340) are received. In other embodiments, however, the first connector portion 335 can be any suitable mechanism or structure to facilitate coupling the first bracket member 320 to the second bracket member 340.

Figure 29:
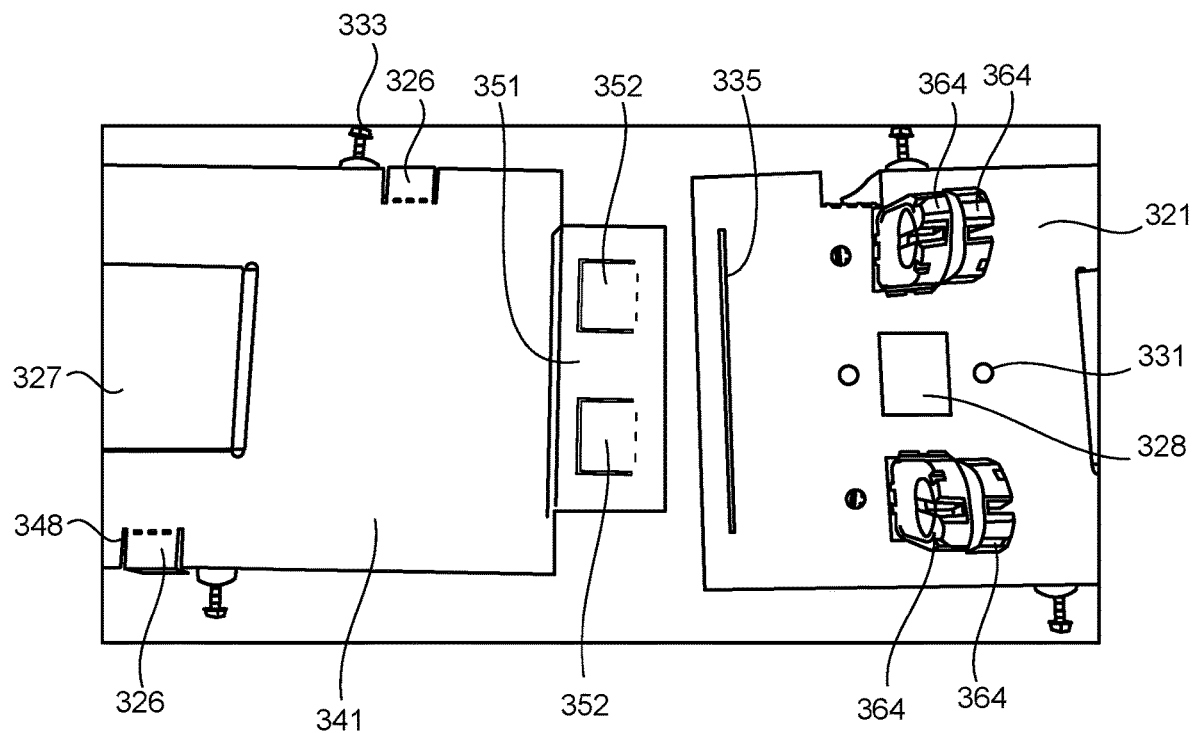
FIG. 29 is an enlarged bottom view of a first end portion of a first bracket of the bracket assembly shown in FIG. 24, aligned with a first end portion of the second bracket of the bracket assembly shown in FIG. 24, the bracket assembly being in a first (or disassembled) configuration.
Figure 30:
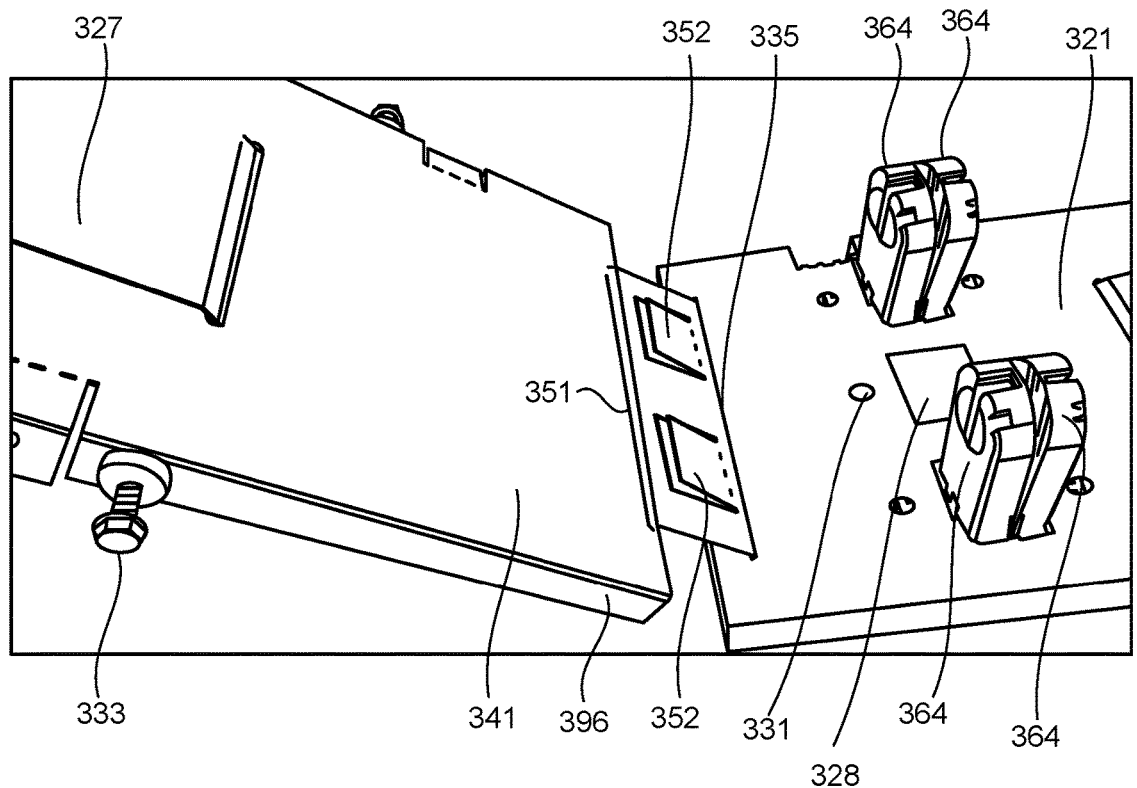
FIG. 30 is a side perspective view of the first end portion of the first bracket of the bracket assembly shown in FIGS. 24 and 29, aligned with the first end portion of the second bracket of the bracket assembly shown in FIGS. 24 and 29.

As shown in FIGS. 29 and 30, the first end portion 321 defines a series of openings 328 and corresponding mounting holes 331. Specifically, each opening 328 is between a pair of mounting holes 331. Each of the sockets 364 is mounted within one of the openings 328, and is retained in place by a protrusion or clip that is locked within the mounting hole 331. In particular, two first sockets 364 are coupled within each opening 328, as shown in FIG. 30. As shown in FIG. 29, the pair of first sockets 364 is oriented in an opposed fashion. Specifically, the opening of one socket 364 is oriented towards the second end portion 322 (and the corresponding second socket 365 at the second end portion 322) and the other socket 364 is oriented away from the second end portion 322 and towards the second end portion 342 of the second bracket member 340. In this manner, one of the sockets 364 (and its corresponding second socket 365) is configured to be electrically coupled to a first LED light assembly (not shown) that is aligned with and supported by first bracket member 320, and the other socket 364 (and its corresponding second socket 365) is configured to be electrically coupled to a second LED light assembly that is disposed end-to-end with the first LED light assembly, and that is aligned with (and supported by the second bracket member 340). Similarly stated, this arrangement allows for the electrical connections for both LED light assemblies to originate within the first bracket member 320.

In other embodiments, however, the sockets 364 can be coupled to the first end portion 321 of the first bracket member 320 by any suitable mechanism. For example, in some embodiments, the sockets 364 can be coupled to the first end portion 321 by a mechanical fastener (e.g., a screw, a clip, or the like), by an interference fit (e.g., within an opening defined by the bracket 220), by an adhesive, or by a weld joint. Because the sockets 364 are coupled to the first end portion 321 of the first bracket member 320, each socket 364 also provides structural support to an LED light assembly.

The first sockets 364 are each configured to be electrically coupled to a first end portion of a LED light assembly (not shown). The sockets 364 (and any of the sockets described herein) can be any suitable socket, such as a pre-wired socket that can hold a standard T8 LED light tube. In some embodiments, the sockets 364 (and any of the sockets described herein) can be a BJB model 26.292 series push through lamp holder (e.g., model 26.292.1111.50) or a LEVITON 13661-SWP lamp holder. As described in more detail below, the bracket assembly 390 can optionally include an electronics assembly 360 (see FIG. 25). The electronics assembly 360 can be coupled to any portion of the bracket assembly (e.g., the first bracket member 320), and includes the wiring 361, connector 362, and circuitry (not shown) to electrically couple the sockets 364 (and thus the LED light assemblies) to a power source (not shown).

The second end portion 322 includes a set of second sockets 365, each configured to be coupled to and mechanically support the LED light assembly. Similar to the arrangement described above for the bracket 220, the second end portion 322 defines a series of indentations and corresponding mounting holes. Each socket 365 is mounted within one of the indentations, and is retained in place by a protrusion or clip that is locked within the mounting hole. In other embodiments, the second set of sockets 365 can be coupled to the second end portion 322 by any suitable mechanism. The first socket 364 coupled to the first end portion 321 and the second socket 365 coupled to the second end portion 322 are spaced and oriented to couple a selected LED light assembly between the first socket 364 coupled to the first end portion 321 and the second socket 365 coupled to the second end portion 322. In some embodiments, the LED light assembly includes a T8 LED light tube.

As shown, the second end portion 322 does not provide an electrical connection between a power source (not shown) and the LED light assemblies coupled thereto and/or does not include any electronic components nor other wiring of the electronics assembly 360. Thus, the second sockets 365 provide only mechanical support to retain the LED light assembly in the desired position (e.g., between the first socket 364 and the second socket 365). In other embodiments, however, the second sockets 365 can also be electrically coupled and/or provide power to the LED light assembly. The second sockets 365 (and any of the sockets described herein) can be suitable socket, such as a pre-wired socket that can hold a standard T8 LED light tube. In some embodiments, the second sockets 265 (and any of the sockets described herein) can be a BJB model 26.292 series push through lamp holder (e.g., model 26.292.1111.50) or a LEVITON 13661-SWP lamp holder.

In some embodiments, the first bracket member 320 includes a first wall 391, a second wall 392, and a third wall 393. The first wall 391 connects the first end portion 321 to the second end portion 322. The second wall 392 and the third wall 393 are each attached to the first wall 391, with the second wall 392 being opposite the third wall 393. Collectively, the first wall 391, the second wall 392, and the third wall 393 define a channel 394. In some embodiments, the channel 394 can optionally contain the electronics assembly 360. The electronics assembly 360 can be coupled to any portion of the first bracket member 320, and can include the wiring 361, connectors 362, a wiring retention clip 366 and circuitry (not shown) to electrically couple the socket 364 (and thus an LED light assembly) to a power source (not shown). In this manner, when the bracket assembly 390 is installed, such components can be covered and/or maintained in the enclosed channel. In some embodiments, the first bracket member 320 may also include an access panel 327 movably coupled about an access opening 337. The access panel can provide access to the enclosed channel without requiring that the bracket assembly 390 be removed from the mounting structure. For example, in some embodiments, the electronics assembly 360 (including the wiring or connectors) can be accessed for service or replacement after the bracket assembly has been installed, and without requiring removal of a portion of the bracket assembly 390. In some embodiments, the access panel is secured by a fastener 325 as shown in FIG. 24. Some embodiments will include will include a pre-attached safety label 370 affixed near the access panel 327, though the label may be placed at any desired location along the bracket assembly 390.

Figure 34:
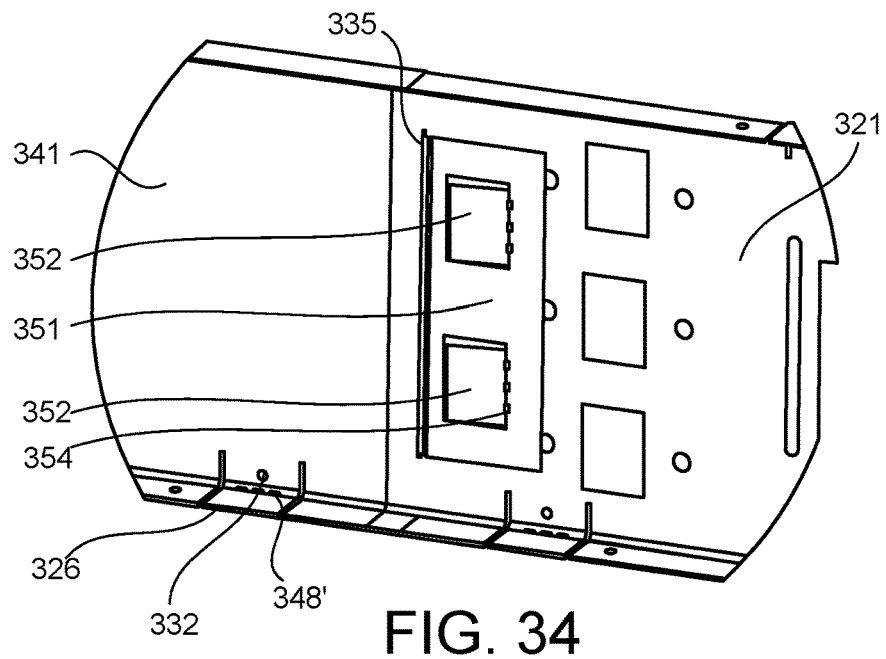
FIGS. 34 and 35 are top views of a portion of the bracket assembly shown in FIG. 24 with the first bracket coupled to a second bracket, the second bracket being in a first position.

The second bracket member 340 defines a longitudinal axis $A_2$ (see, e.g., FIG. 27) and includes a first end portion 341 and a second end portion 342. The first end portion 341 of the first bracket member 340 includes a second connector portion 351. The second connector portion 351 is configured to engage the first connector portion 335 to movably couple the second bracket member 340 to the first bracket member 320 and support the weight of the second bracket member 340. In particular, the second connector portion 351 includes a series of connecting tabs 352 configured to engage the first bracket member 320 when the connecting tab 352 is inserted into the slot 335 of the first bracket member 320. As shown in FIG. 34, the connecting tab 352 is coupled to the second connector portion by a perforated connection 354, which facilitates the engagement of the connecting tab 352 in the slot 335. In other embodiments, however, the second connector portion 351 can be any suitable mechanism or structure to facilitate coupling the first bracket member 320 to the second bracket member 340. For example, in some embodiments, the second connector portion need not include perforated tabs, but can instead include hooks, ball-and-socket connectors, or the like.

The second end portion 342 of the second bracket member 340 includes a second socket 364. Similar to the arrangement described above for the bracket 220, the second end portion 342 defines a series of indentations and corresponding mounting holes. Each socket 365 is mounted within one of the indentations, and is retained in place by a protrusion or clip that is locked within the mounting hole. In other embodiments, the set of sockets 365 can be coupled to the second end portion 342 by any suitable mechanism. The second sockets 365 are configured to be coupled to a LED light assembly. The second bracket member 340 does not contain any of the optional electronics assembly 360. Thus, the set of sockets 365 provide only mechanical support to retain the LED light assembly in the desired position (e.g., between the first socket 364 of the first bracket member 320 and the second socket 365 of the second bracket member 340). In other embodiments, however, the second sockets 365 of the second bracket member 340 can also be electrically coupled and/or provide power to the LED light assemblies coupled thereto.

As shown, the second bracket member 340 includes a first wall 395, a second wall 396, and a third wall 397. The first wall 395 connects the first end portion 341 to the second end portion 342. The second wall 396 and the third wall 397 are each attached to the first wall 395, with the second wall 396 being opposite the third wall 397. Collectively, the first wall 395, the second wall 396, and the third wall 397 define a channel 398. In some embodiments, the second bracket member 340 may also include an access panel 327 movably coupled about an access opening 337. The access panel can provide access to the enclosed channel without requiring that the bracket assembly 390 be removed from the mounting surface. For example, in some embodiments, the electronics assembly 360 (including the wiring or connectors) can be accessed for service or replacement after the bracket assembly has been installed, and without requiring removal of a portion of the bracket assembly 390. In some embodiments, the access panel is secured by a fastener 325 as shown in FIG. 24.

The second bracket member 340 is configured to move relative to the first bracket member 320 between a first position and a second position to facilitate installation about a strip lighting fixture. The first longitudinal axis $A_1$ of the first bracket member 320 and the second longitudinal axis $A_2$ of the second bracket member 340 define a first bracket angle when the second bracket assembly 340 is in the first position, the first longitudinal axis $A_1$ and the second longitudinal axis $A_2$ defining a second bracket angle when the second bracket assembly is in the second position, the second bracket angle less than the first bracket angle. Specifically, prior to installation, the bracket assembly 390 can be assembled (i.e., transitioned from a first, or disassembled, configuration, to a second, or assembled, configuration) by inserting the tabs 352 of the second bracket member 340 into the slot 335 of the first bracket member 320, as shown in FIGS. 29 and 30. When bracket assembly 390 is in its second configuration (i.e., the initial assembled configuration), the second bracket member 340 is movably coupled to the first bracket member 320. Moreover, when bracket assembly 390 is in its second configuration (i.e., the initial assembled configuration, see FIG. 33), the first longitudinal axis $A_1$ of the first bracket member 320 and the second longitudinal axis $A_2$ of the second bracket member 340 are substantially coaxial. For example, the bracket assembly can be placed on a floor or other support structure to maintain the bracket assembly in the second configuration (i.e. with the second bracket member being in a first position).

Figure 31:
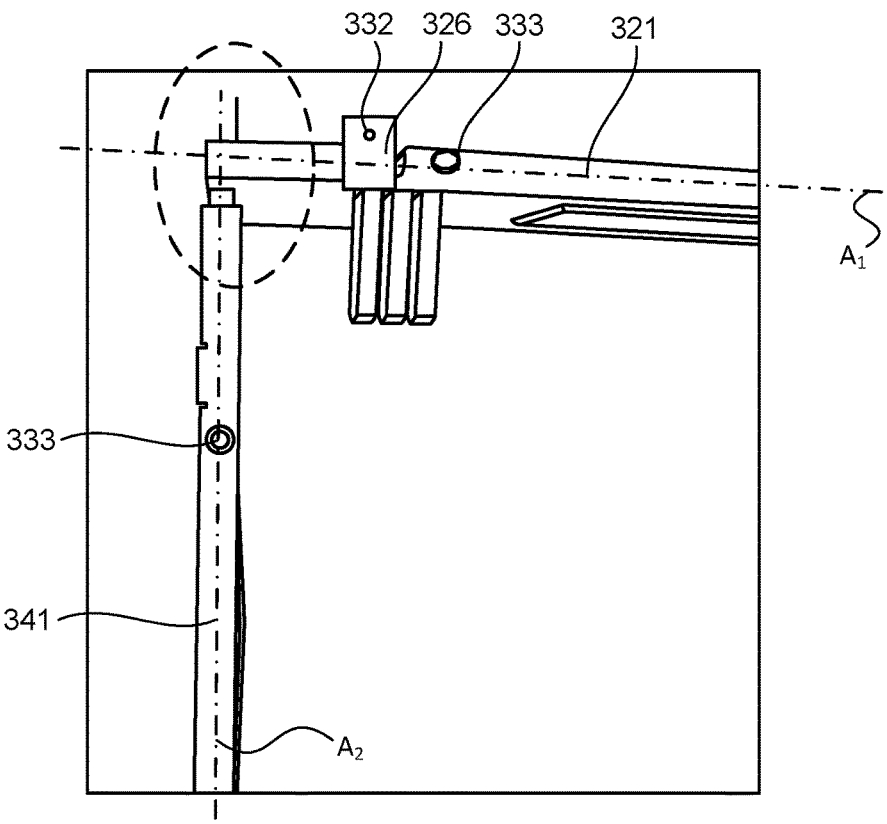
FIGS. 31 and 32 are a side view and a side perspective view, respectively, of a portion of the bracket assembly shown in FIGS. 24, 29, and 30 after the second bracket has been connected to the first bracket such that the second bracket movably hangs from the first bracket in a second configuration.
Figure 32:
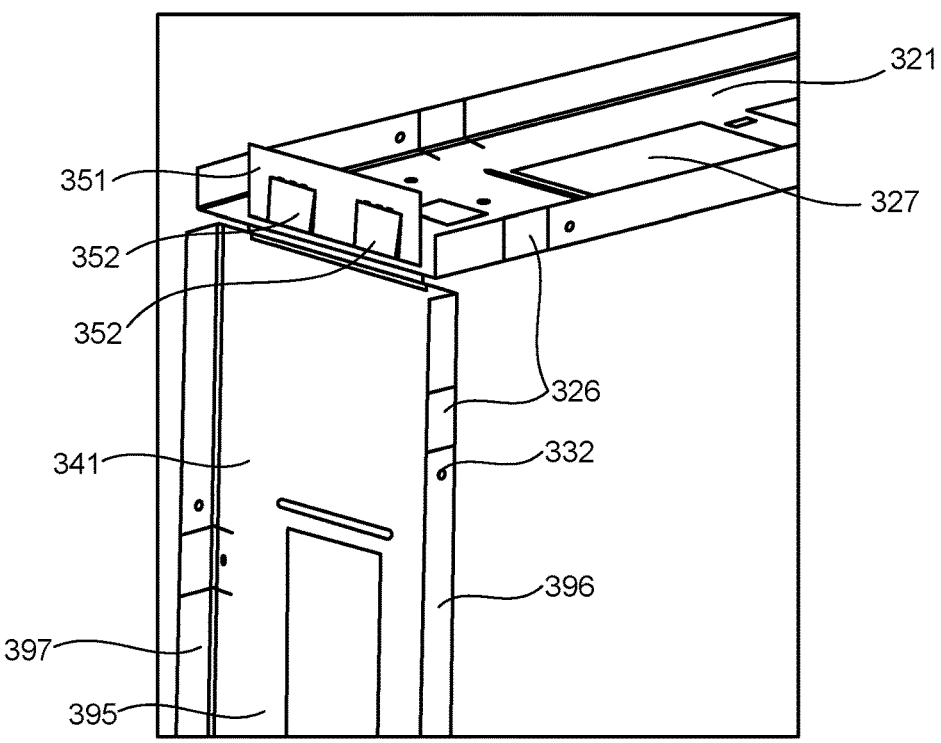
Figure 33:
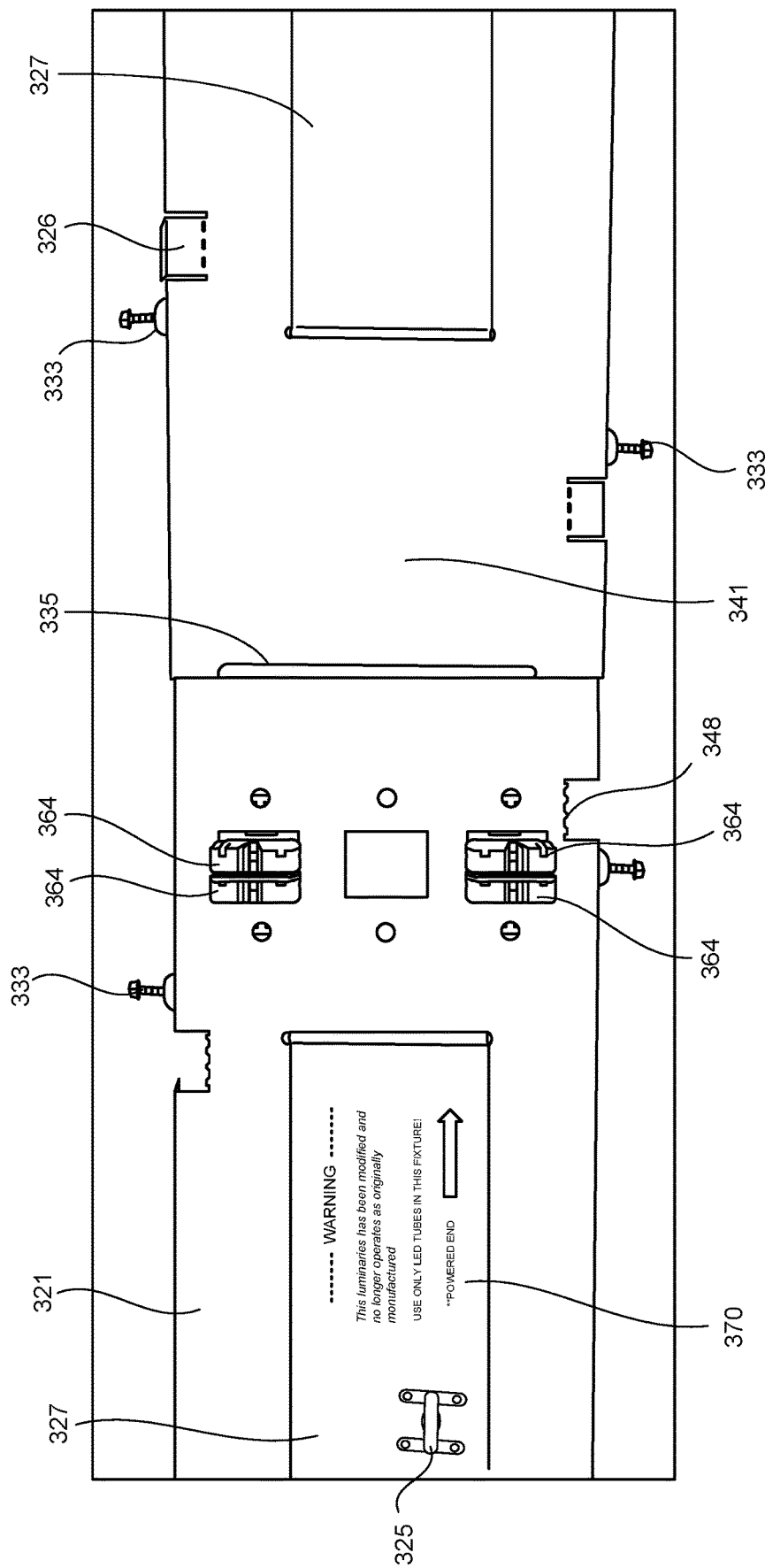
FIG. 33 is bottom view of the bracket assembly shown in FIG. 24 with the first bracket coupled to the second bracket, the second bracket being in a first position.

To facilitate installation, the bracket assembly 390 is transitioned from the second configuration to the third configuration (FIGS. 31 and 32). To transition the bracket assembly 390 from the second configuration to the third configuration, the second bracket member 340 is rotated relative to the first bracket member 320 from a first position to a second position. When the second bracket member 340 is in the second position, the second bracket angle is less than about 170 degrees. More particularly, the second bracket assembly can be between about 80 degrees and about 100 degrees. When the bracket assembly 390 is in the third configuration, the second end portion 322 of the first bracket member 320 and the second end portion 342 of the second bracket member 340 are brought closer together. This arrangement facilitates easier handling of the bracket assembly 390 for installation.

After the bracket assembly 390 is in the third configuration, the first bracket member 320 can be moved over a strip lighting fixture (or through a troffer opening) and into contact with a mounting surface. In some embodiments, the strip fixture (not shown) can be disposed within the channel 394. The first bracket member 320 can be fastened to the mounting surface using any suitable mechanism. For example, as shown, the bracket assembly 390 includes with a series of mounting flanges 326 defining mounting holes within which a series of fasteners 333 are captively fastened. Thus, a user can support the first bracket member 320 by applying an upward force about with a first hand, while installing the captive fasteners 333 to secure the flanges 326 to the mounting surface with a second hand.

After the first bracket member 320 is fastened, the second bracket member 340 can then be rotated and/or moved relative to the first bracket member 320 from its second position back towards its first position. In this manner, the bracket assembly 390 can be transitioned from the third configuration to a fourth configuration. The second bracket member 340 can be moved over the strip lighting fixture (or through a troffer opening) and into contact with a mounting surface. In some embodiments, the strip fixture (not shown) can be disposed within the channel 398. The second bracket member 340 can be fastened to the mounting surface using the captive fasteners 333 as described above.

Figure 37:
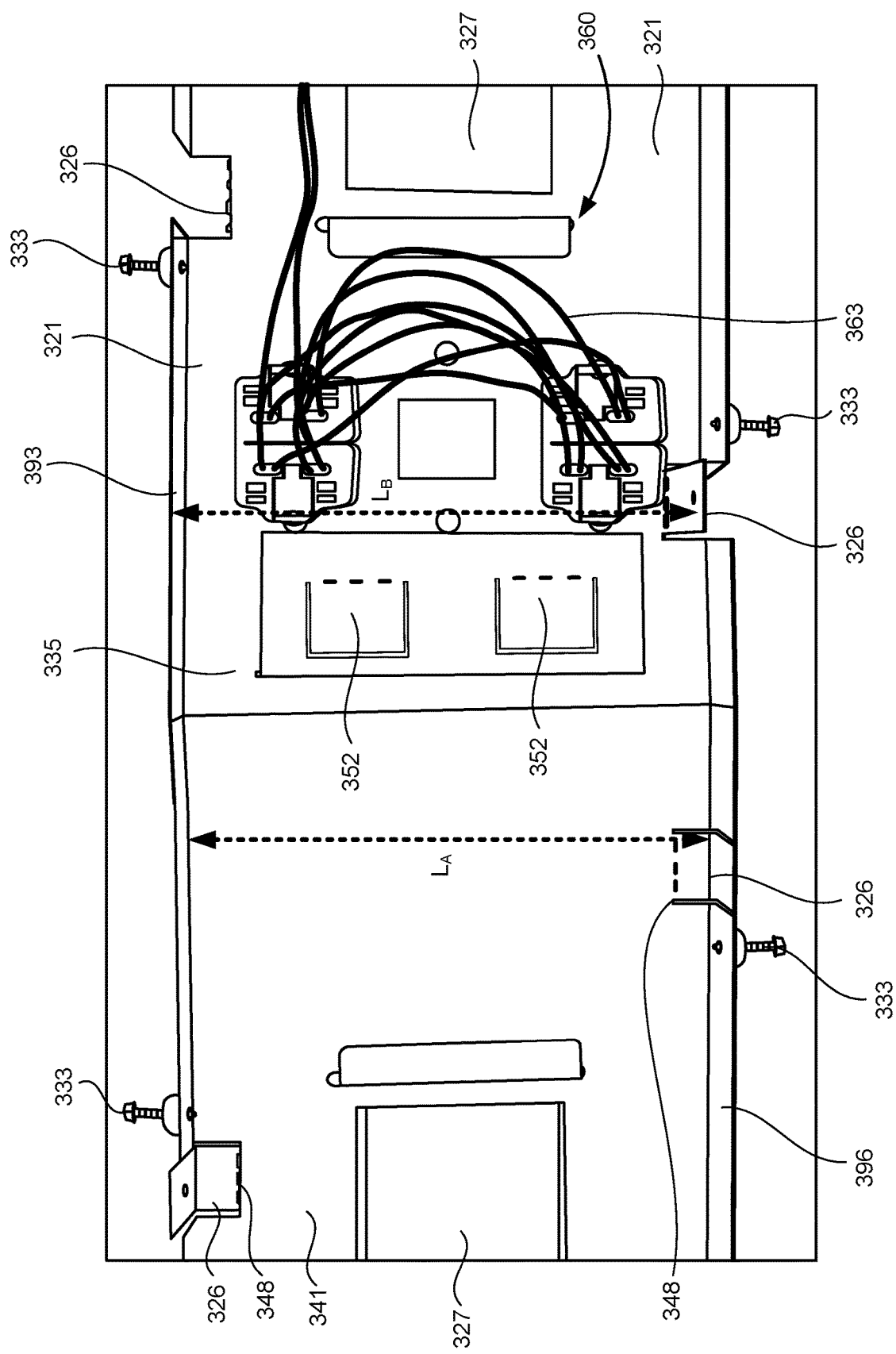

In some embodiments, the first bracket member 320 is configured so that the second wall 392 is spaced apart from the third wall 393 such that the channel 394 has a first width (see e.g., the first width LA shown for the second bracket member 340 in FIG. 37). The first width LA corresponds to the fluorescent strip light being converted to an LED light. For example, in some embodiments, the first width can correspond to a five-inch strip width. As shown, the first bracket member 320 includes a movable mounting flange 326 coupled by perforations 348 to at least one of the first wall 391, or the second wall 392. The movable mounting flange is spaced apart from the third wall 393 by such a distance that a portion of the channel 394 can be transitioned to have a second width LB (see FIG. 37). The second width corresponds to a second mounting structure of the fluorescent strip light being converted and is less than the first width. For example, in some in some embodiments, the first width can correspond to a 4.25-inch strip width. Moreover, other embodiments include additional movable mounting flange 326 coupled by perforations 348 to at least one of the first wall 391, or the third wall 393. In some embodiments, the movable mounting flanges are constructed with mounting holes 332 and in some embodiments, the mounting holes contain captive fasteners 333. The inclusion of captive fasteners enables bracket assembly 390 to be more quickly installed.

Similarly, the second bracket member 340 is configured so that the second wall 396 is spaced apart from the third wall 397 such that the channel 398 has a first width LA that corresponds to the fluorescent strip light being converted to an LED light. The second bracket member 340 includes a movable mounting flange 326 coupled by perforations 348 to at least one of the first wall 395, or the second wall 396. The movable mounting flange is spaced apart from the third wall 393 by such a distance that a portion of the channel 398 has a second width (see e.g., the second width LB shown for the first bracket member 320 in FIG. 37). The second width corresponds to a second mounting structure of the fluorescent strip light being converted and is less than the first width. In addition to the above, other embodiments include additional movable mounting flange 326 coupled by perforations 348 to at least one of the first wall 395, or the third wall 397. In some embodiments, the movable mounting flanges are constructed with mounting holes 332 and in some embodiments, the mounting holes contain captive fasteners 333. The inclusion of captive fasteners enables bracket assembly 390 to be more quickly installed.

Figure 35:
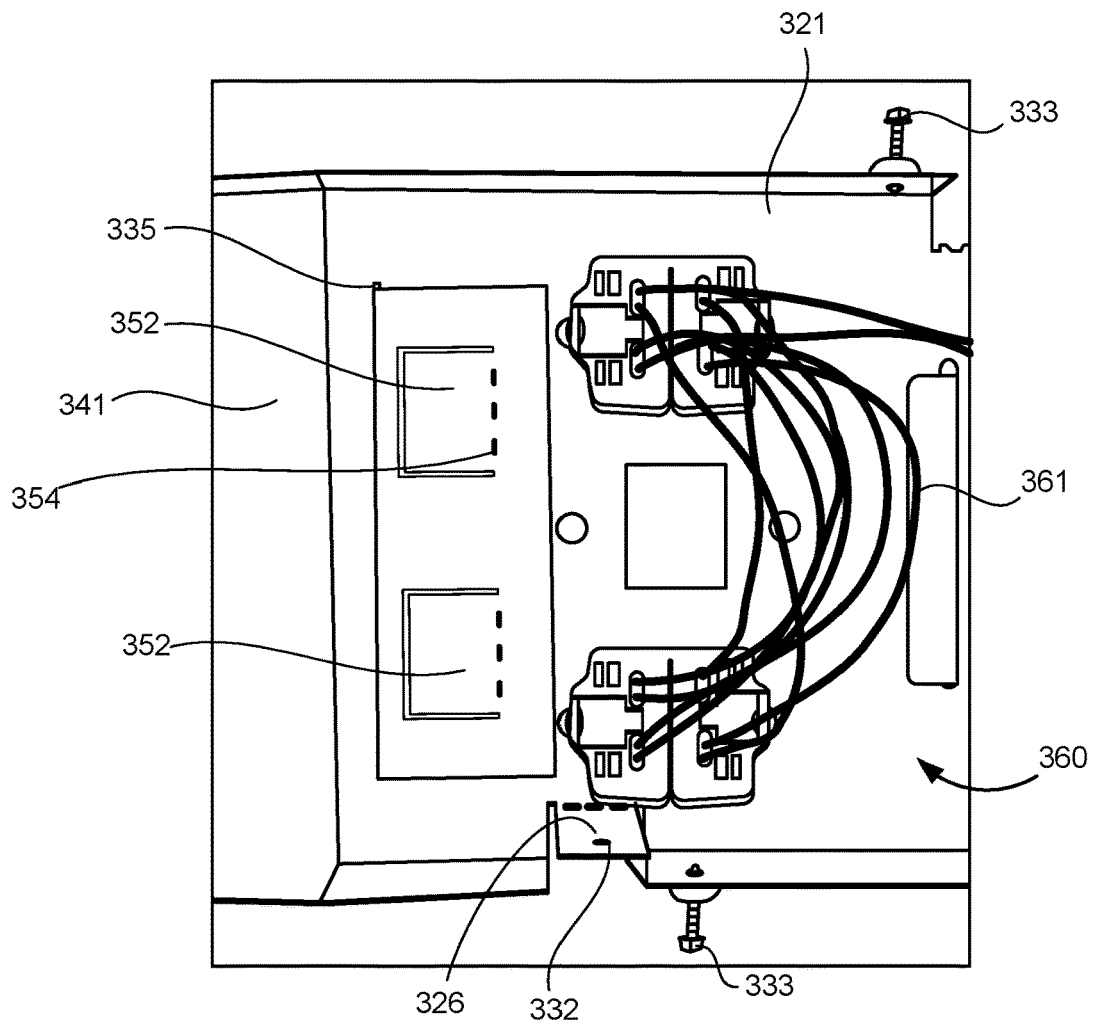
Figure 36:
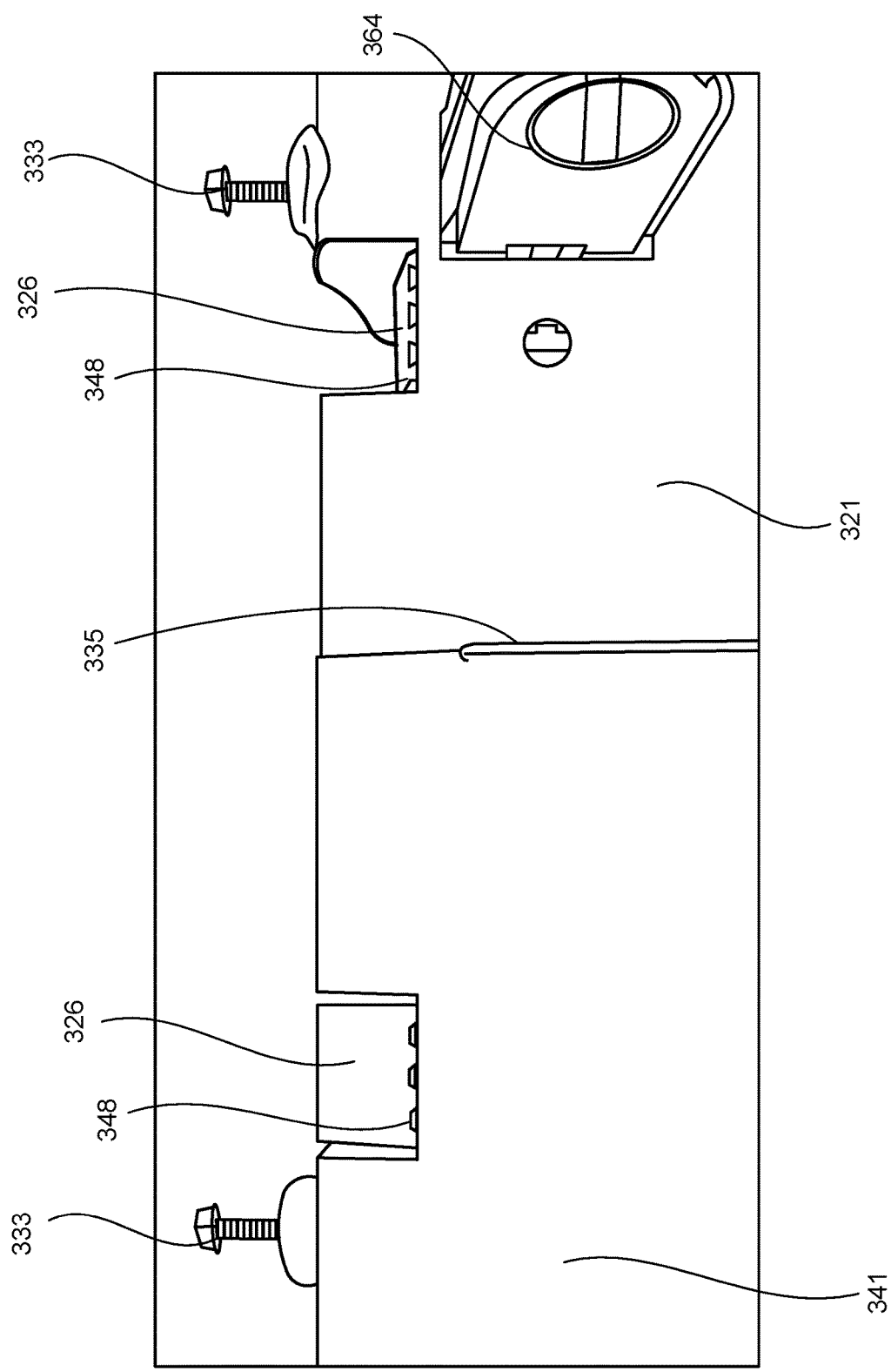
FIGS. 36 and 37 are enlarged bottom and top views, respectively, of the bracket assembly shown in FIG. 24 with a first bracket coupled to a first end portion of the second bracket, showing a flange deformed to accommodate a specific mounting width.

In some embodiments, the mounting flanges 326 can include a hole through which a fastener can be placed to secure the bracket assembly 390 to a strip (not shown) or other mounting structure. For example, referring to FIGS. 34 and 35, the mounting flange can include a hole 332. Additionally, the mounting flanges 326 can include a second perforation 348' along the edge where the horizontal portion of the flange intersects the vertical portion of the flange. In this manner, when the flange 326 is deformed inward to accommodate a narrower mounting structure, the end portion of the flange 326 can be removed via the second perforation 348', as shown in FIG. 35. Moreover, although the flanges 326 are shown and described as allowing the bracket assembly 390 to accommodate either a five-inch or 4.25-inch mounting structure, the flanges can be deformed to any suitable position to accommodate a width of anywhere between four inches and five inches. For example, in some embodiments, the flanges 326 can be bent along the first perforation 348 by an angle of greater than ninety degrees (to accommodate a width less than 4.25 inches).

Figure 38:
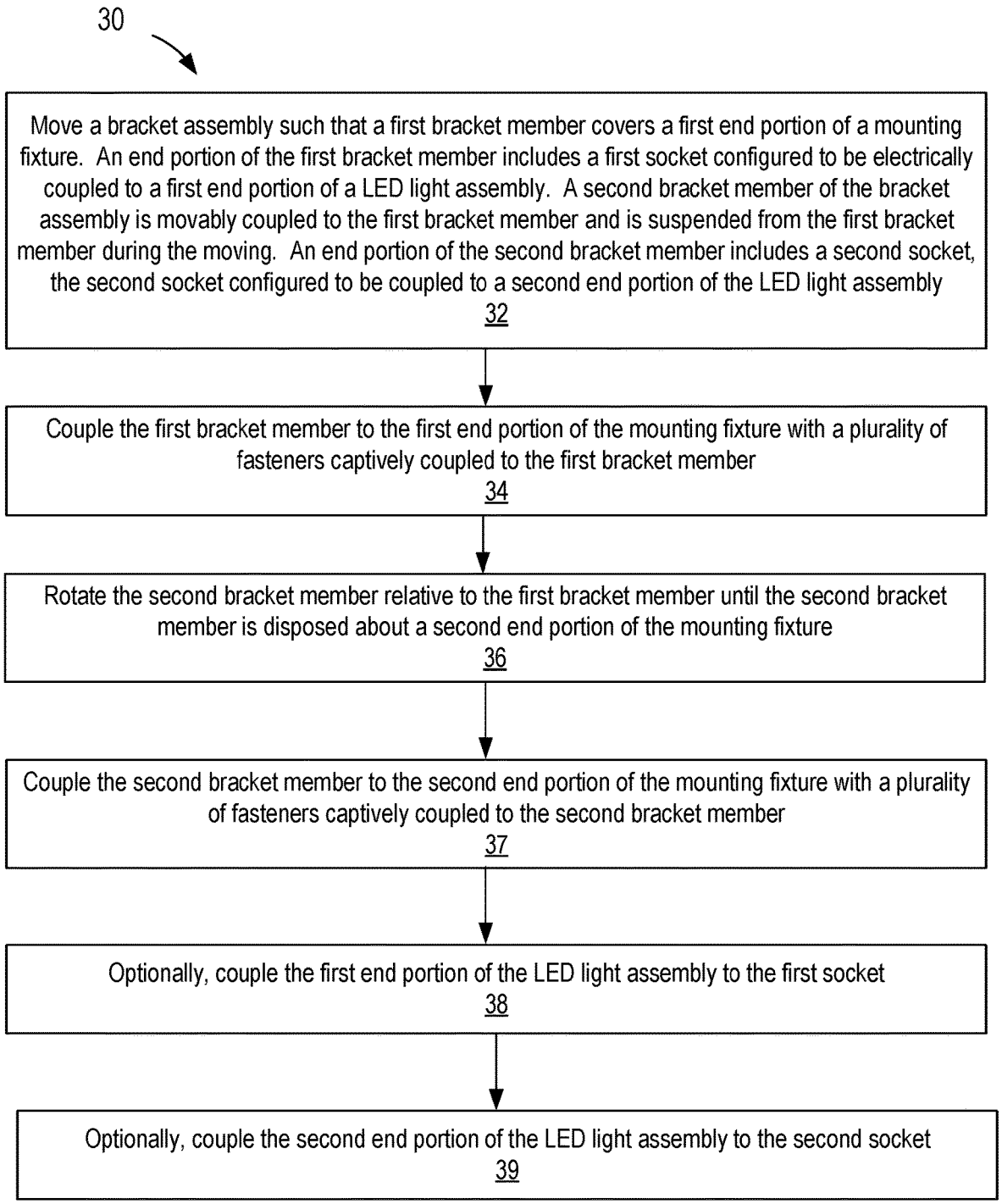
FIG. 38 is a flow chart of a method of converting a fluorescent strip channel lighting fixture to a LED strip channel lighting fixture according to an embodiment.

FIG. 38 illustrates a method 30 of installing a LED lighting fixture, according to an embodiment. Although the method 30 is described in conjunction with the bracket assembly 390 shown and described above, in other embodiments, the method 30 can be performed using any suitable bracket assembly described herein. The method includes moving a bracket assembly such that a first bracket member (e.g., the first bracket member 320) covers a first end portion of a mounting fixture, at 32. An end portion (e.g., the first end portion 321) of the first bracket member includes a first socket configured to be electrically coupled to a first end portion of a LED light assembly. A second bracket member (e.g., the second bracket member 340) of the bracket assembly is movably coupled to the first bracket member and is suspended from the first bracket member during the moving. An end portion (e.g., the second end portion 342) of the second bracket member includes a second socket configured to be coupled to a second end portion of the LED light assembly.

The first bracket member is secured to the first end portion of the mounting fixture with fasteners captively coupled to the first bracket member, at 34. Once the first bracket member is secured, the second bracket member is rotated relative to the first bracket member until the second bracket member is in the desired location about a second end portion of the mounting fixture, at 36. In some embodiments, the second bracket member can be rotated at a coupling interface between the first bracket member and the second bracket member (e.g., the connecting portions 351 and 335, described above). In other embodiments, the second bracket member and/or the first bracket member can be deformed to facilitate the rotation.

The second bracket member is then secured to the second bracket member with fasteners captively coupled to the second bracket member, at 37. In some embodiments, the method 30 optionally includes coupling a first end portion of the LED light assembly to the first socket (i.e., the socket on the first bracket member), at 38, and coupling a second end portion of the LED light assembly to the second socket (i.e., the socket on the second bracket member), at 39.

Although the bracket assembly 200 is shown and described as being monolithically constructed, in other embodiments, certain portions of a deformable bracket assembly can be monolithically constructed and other portions can be separately constructed and later joined to the deformable portions. For example, in some embodiments, the vertical (or lateral) edges 230 described above can be separately constructed members that are joined to the first wall 291. Such an arrangement can provide more flexibility regarding the arrangement between a central portion (or channel) and the end portions. For example, FIGS. 39-41 a portion of a bracket 520 according to an embodiment. The bracket 520 can be used with or make up a part of any of the bracket assemblies described herein, including the bracket assembly 290. The bracket 520 includes a first end portion 521, a second end portion, and a central portion 523. The bracket assembly 590 is similar in many respects to the bracket assembly 290 described above, and therefore certain aspects (e.g., sockets, wiring, etc.) are not described in detail below.

Figure 39:
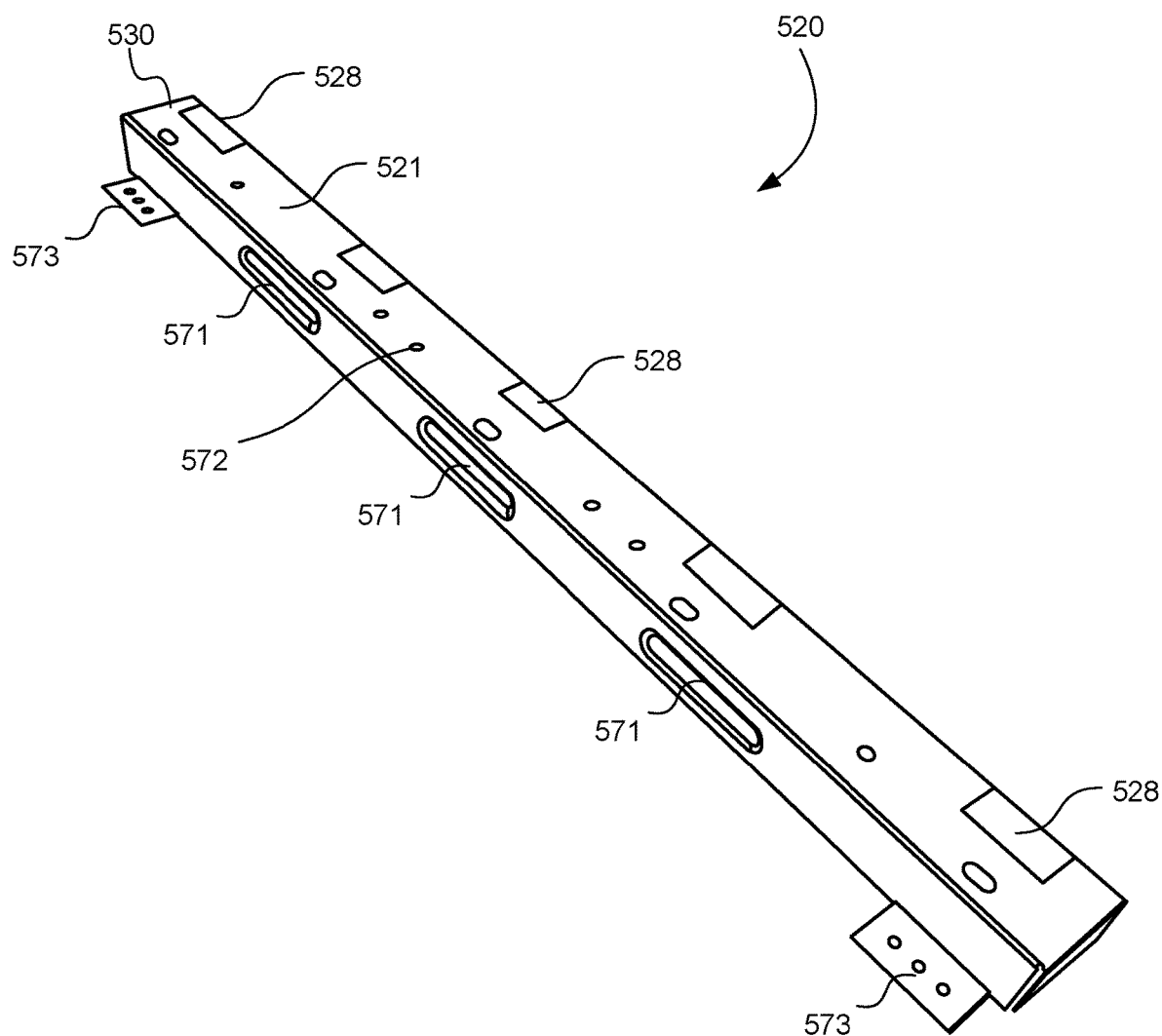
FIG. 39 is a perspective view of an end portion of a bracket assembly according to an embodiment.
Figure 40:
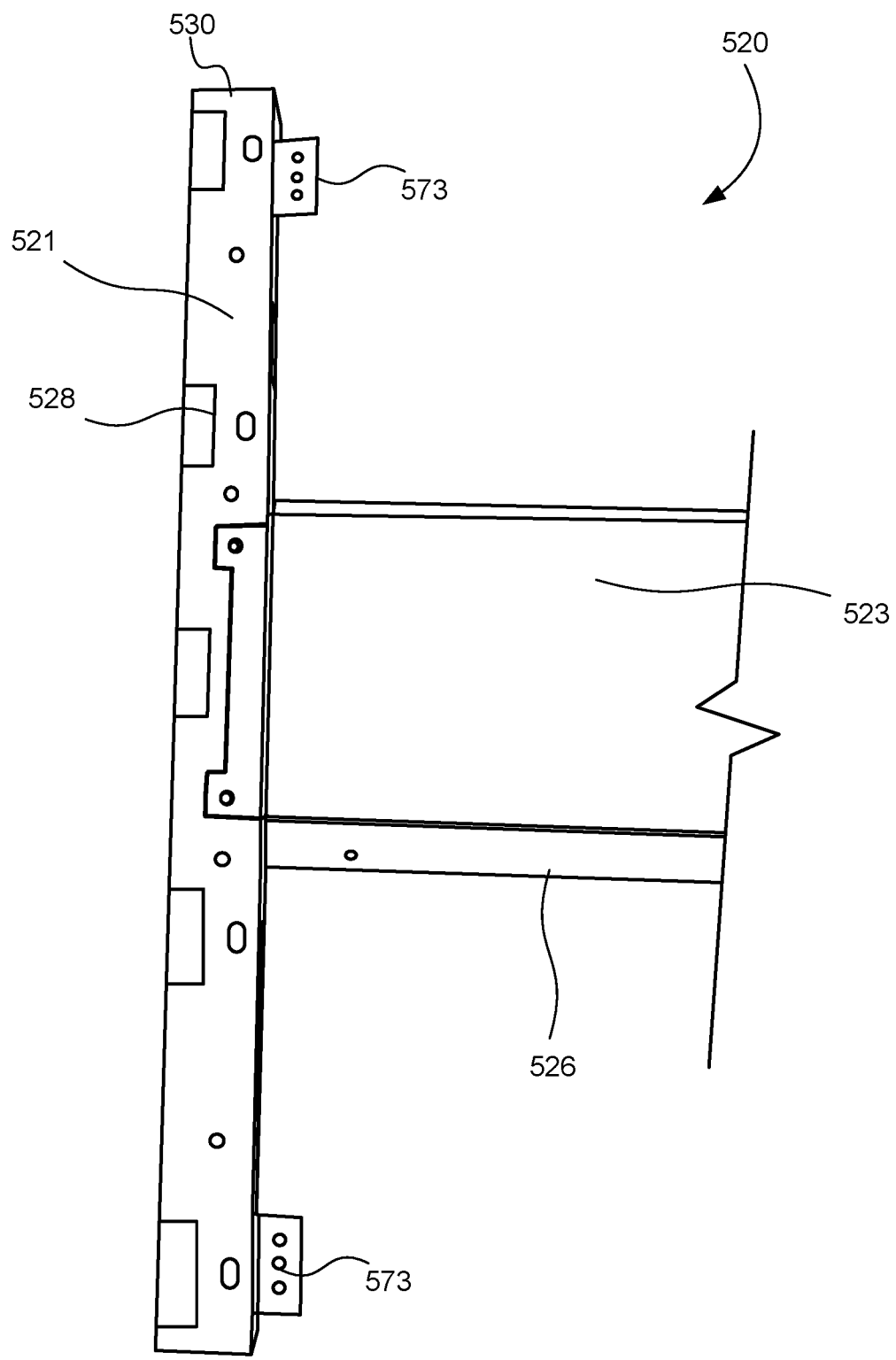
FIGS. 40 and 41 are bottom views of a portion of the bracket assembly shown in FIGS. 39 and 40, showing a central portion in a first position and a second position, respectively.
Figure 41:
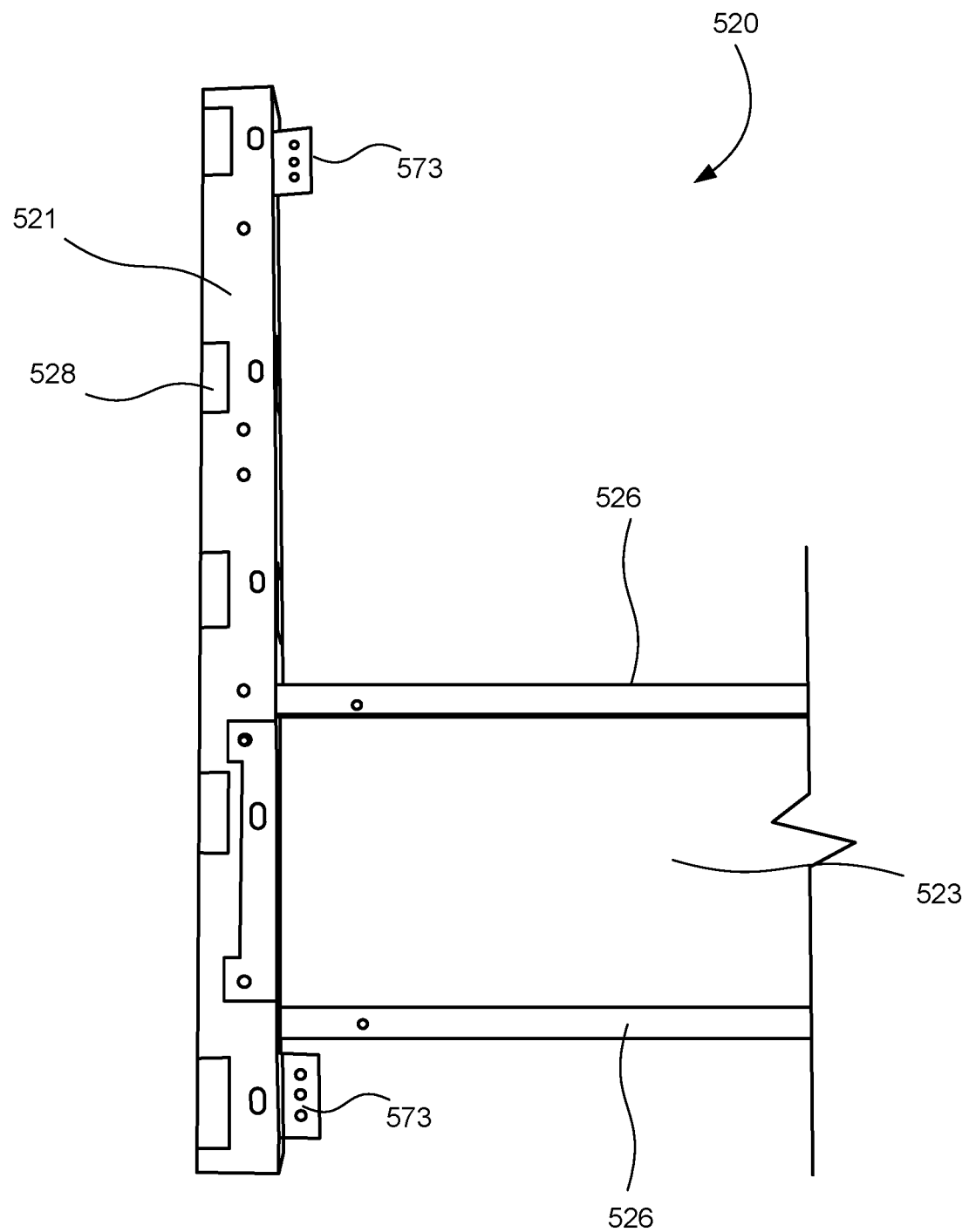

As shown in FIG. 39, the first end portion 521 (and the second end portion, not shown) each include a lateral member 530 that is separately constructed from the central portion 523. The lateral member 530 provides the structure to which a series of sockets (e.g., the sockets 264 or 265 described above) can be mounted. More particularly, the lateral member 530 defines a series of indentations 528 within which each socket can be mounted. The lateral member 530 also defines a series of mounting holes 572 and pass-through openings 571. The mounting holes 572 provide a location to which the central portion 523 can be coupled. The pass-through openings 571 provide a passageway through which portions of an electronics assembly (e.g., the electronics assembly 260), such as a wiring harness, can be disposed. By including multiple mounting locations and pass-through openings 571, the lateral member 530 can facilitate mounting the central portion 523 in several different locations. For example, as shown in FIG. 40, in some embodiments, the central portion 523 can be coupled to the lateral member 530 such that the channel of the central portion 523 is centrally coupled (i.e., the central portion 523 bisects the lateral member 530). In other embodiments, as shown in FIG. 41, the central portion 523 can be coupled to the lateral member 530 such that the channel of the central portion 523 is offset. This arrangement can accommodate installation into a variety of different troffers.

The lateral member 530 includes a series of flanges 573, and the central portion 523 includes a series of flange 526.

The flanges 573 and the flanges 526 can be used to couple the bracket 520 to an inner surface of a troffer, as described herein.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, the central portion of the bracket does not contain notches but rather has a telescoping design such that the bracket can slide between a first linear configuration of a length $L_X$ and a second linear configuration of a length $L_Y$, where $L_Y$ is less than $L_X$. In this embodiment the user holds both ends of the central portion of the bracket and slides the bracket into a second configuration. The user then inserts the bracket into the internal volume of the troffer of an existing lighting fixture. Once in the internal volume of the troffer, the user can slide the bracket back into a first configuration so that the first end portion and the second end portion of the bracket extend to touch the ends of the troffer. In some embodiments, the telescoping design can be spring-loaded such that the bracket is biased in the first (or expanded) linear configuration.

The bracket 120 (and any of the brackets shown and described herein) can be made of any suitable light-weight metal that can be bent or configured to be bent. In some embodiments, the bracket 120 will include a pre-attached safety label (See FIG. 9, 270).

Although various embodiments have been described as having particular features and/or combinations of components, other embodiments are possible having a combination of any features and/or components from any of embodiments where appropriate. For example, any of the brackets shown and described herein can include any features of another bracket shown and described herein. As one example, the bracket assembly 290 can include the quarter-turn fastener 425 shown and described with respect to the bracket assembly 490.

What is claimed is:

1. An apparatus, comprising:
    a bracket assembly having a first end portion, a second end portion, and a central portion between the first end portion and the second end portion, the first end portion including a first socket configured to be electrically coupled to a first end portion of a LED light assembly, the second end portion including a second socket configured to be coupled to a second end portion of the LED light assembly,
    the central portion joining the first end portion and the second end portion such that the second end portion can move relative to the first end portion to transition the bracket assembly between a first configuration and a second configuration, the bracket assembly having a first length when the bracket assembly is in the first configuration, the bracket assembly having a second length when the bracket assembly is in the second configuration, the second length less than the first length.

2. The apparatus of claim 1, wherein the central portion includes a first wall, a second wall, and a third wall, the first wall extending between the first end portion and the second end portion, the second wall and the third wall each attached to the first wall, the second wall opposite the third wall such that the first wall, the second wall, and the third wall collectively define a channel.

3. The apparatus of claim 2, further comprising:
    an electronic assembly at least partially disposed within the channel, the electronic assembly configured to electrically couple the first socket to a power source.

4. The apparatus of claim 3, wherein the first wall of the central portion includes an access panel movably coupled about an access opening, the access panel providing access to the electronic assembly within the channel.

5. The apparatus of claim 1, wherein the first end portion, the second end portion, and the central portion are monolithically constructed, the central portion configured to deform when the bracket assembly is transitioned between the first configuration and the second configuration.

6. The apparatus of claim 1, wherein:
    the central portion includes a first wall, a second wall, and a third wall, the first wall extending between the first end portion and the second end portion, the second wall and the third wall each attached to the first wall, the second wall opposite the third wall such that the first wall, the second wall, and the third wall collectively define a channel; and
    at least one of the second wall or the third wall defines a notch positioned such that the central portion is deformed to transition the bracket assembly between the first configuration and the second configuration.

7. The apparatus of claim 6, wherein the notch is defined by opposing surfaces defining an angle of up to about 45 degrees.

8. The apparatus of claim 6, wherein the first wall includes a perforation positioned to facilitate bending of the first wall when the central portion is deformed to transition the bracket assembly between the first configuration and the second configuration.

9. The apparatus of claim 1, wherein:
    a longitudinal axis of the first end portion and a longitudinal axis of the second end portion form a first bracket angle when the bracket assembly is in the first configuration, the longitudinal axis of the first end portion and the longitudinal axis of the second end portion defining a second bracket angle when the bracket assembly is in the second configuration, the second bracket angle less than the first bracket angle.

10. The apparatus of claim 1, wherein a distance between the first socket and the second socket is defined by a length of the LED light assembly.

11. The apparatus of claim 10 wherein the LED light assembly includes a T8 LED light tube.

12. The apparatus of claim 1, wherein:
    the first end portion of the bracket assembly is a first bracket member, the first bracket member defining a slot; and
    the second end portion of the bracket assembly is a second bracket member, the second bracket member including a connecting tab configured to be disposed within the slot to movably couple the second bracket member to the first bracket member thereby defining the central portion of the bracket assembly.

13. An apparatus, comprising:
    a bracket assembly having a first end portion, a second end portion, and a central portion between the first end portion and the second end portion, the first end portion including a first socket configured to be electrically coupled to a first end portion of a LED light assembly, the second end portion including a second socket configured to be coupled to a second end portion of the LED light assembly, the central portion configured to deform such that the second end portion can move relative to the first end portion to transition the bracket assembly between a first configuration and a second configuration, the bracket assembly having a first length when the bracket assembly is in the first configuration, the bracket assembly having a second length when the bracket assembly is in the second configuration, the second length less than the first length.

14. The apparatus of claim 13, wherein:

the first end portion, the second end portion, and the central portion are monolithically constructed; and the central portion defines at least one of a perforation, a notch, or an opening configured to facilitate deformation of the central portion.

15. The apparatus of claim 13, wherein a first region of the central portion has a first thickness less than a second thickness of a second region of the central portion, the first thickness configured to facilitate deformation of the central portion.

16. The apparatus of claim 13, wherein:

the central portion includes a first wall, a second wall, and a third wall, the first wall extending between the first end portion and the second end portion, the second wall and the third wall each attached to the first wall, the second wall opposite the third wall such that the first wall, the second wall, and the third wall collectively define a channel; and at least one of the second wall or the third wall defines a notch positioned such that the central portion is deformed to transition the bracket assembly between the first configuration and the second configuration.

17. The apparatus of claim 16, wherein the notch is defined by opposing surfaces defining an angle of up to about 45 degrees.

18. The apparatus of claim 13, wherein a distance between the first socket and the second socket is defined by a length of the LED light assembly.

19. The apparatus of claim 18, wherein the LED light assembly includes a T8 LED light tube.

20. A method of installing a light-emitting diode (LED) lighting fixture, comprising:

transitioning a bracket assembly from a first configuration to a second configuration, the bracket assembly including a first end portion having a first socket and a second end portion having a second socket, the bracket assembly having a first length when the bracket assembly is in the first configuration, the bracket assembly having a second length when the bracket assembly is in the second configuration, the first length such that a LED light assembly can be coupled to the first socket and the second socket, the second length less than the first length;

moving, after the transitioning, the bracket assembly into an inner volume of a troffer;

transitioning the bracket assembly, after the moving, from the second configuration back towards the first configuration such that the first end portion and the second end portion of the bracket assembly each contact an inner surface of the troffer; and fastening the bracket assembly to the inner surface of the troffer.

* * * * *